(12) United States Patent
Jeon et al.

(10) Patent No.: US 8,599,731 B2
(45) Date of Patent: *Dec. 3, 2013

(54) METHOD OF EXCHANGING MESSAGES FOR TRANSMISSION POWER CONTROL BETWEEN DEVICES IN A WIRELESS NETWORK, AND DEVICES FOR THE SAME

(75) Inventors: Beom Jin Jeon, Seoul (KR); Joong Heon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 323 days.

This patent is subject to a terminal disclaimer.

(21) Appl. No.: 12/712,143

(22) Filed: Feb. 24, 2010

(65) Prior Publication Data

US 2010/0238879 A1 Sep. 23, 2010

Related U.S. Application Data

(60) Provisional application No. 61/155,503, filed on Feb. 25, 2009.

(30) Foreign Application Priority Data

Dec. 4, 2009 (KR) .................. 10-2009-0119813

(51) Int. Cl.
*H04W 72/04* (2009.01)
(52) U.S. Cl.
USPC .................... 370/311; 370/329; 455/522
(58) Field of Classification Search
USPC .................................. 370/329, 311
See application file for complete search history.

(56) References Cited

U.S. PATENT DOCUMENTS

| | | | |
|---|---|---|---|
| 6,356,759 B1 * | 3/2002 | Mustajarvi | 455/450 |
| 6,643,322 B1 | 11/2003 | Varma et al. | |
| 6,760,596 B1 | 7/2004 | Fiorini et al. | |
| 2002/0141367 A1 * | 10/2002 | Hwang et al. | 370/335 |
| 2004/0106426 A1 * | 6/2004 | Koo et al. | 455/522 |
| 2005/0059422 A1 * | 3/2005 | Rudolf et al. | 455/522 |
| 2007/0286140 A1 * | 12/2007 | Kwon | 370/338 |
| 2007/0286188 A1 * | 12/2007 | Fan et al. | 370/389 |
| 2008/0130617 A1 * | 6/2008 | Singh et al. | 370/345 |
| 2009/0010188 A1 | 1/2009 | Jechoux | |
| 2009/0201827 A1 * | 8/2009 | Kwon et al. | 370/252 |

FOREIGN PATENT DOCUMENTS

| | | |
|---|---|---|
| CN | 101136674 | 3/2008 |
| KR | 1020070058640 | 6/2007 |

OTHER PUBLICATIONS

The State Intellectual Property Office of the People's Republic of China Application Serial No. 201080008033.0, Office Action dated Jul. 3, 2013, 12 pages.

\* cited by examiner

*Primary Examiner* — Huy D Vu
*Assistant Examiner* — Teisha D Hall
(74) *Attorney, Agent, or Firm* — Lee, Hong, Degerman, Kang & Waimey

(57) ABSTRACT

A method of exchanging messages for link recommendation in a receiving device of a wireless network comprises receiving a first data packet from a transmitting device; and transmitting link recommendation information to the transmitting device, the link recommendation information including transmit power control (TPC) information for controlling transmission power to be used for a second data packet in the transmitting device.

14 Claims, 20 Drawing Sheets

FIG. 16

HRP MAC header format

| Octets = 8 | 19 | 8 | 24 | 1 | 6 |
|---|---|---|---|---|---|
| MAC control header | MAC extension header | Security header | Video header | CP header | Reserved |
| 90 | 91 | 92 | 93 | 94 | 95 |

LRP MAC header format

| Octets = 8 | 19 | 8 | 8 | 1 |
|---|---|---|---|---|
| MAC control header | MAC extension header | Security header | ReBoM header | CP header |
| 90 | 91 | 92 | 96 | 94 |

METHOD OF EXCHANGING MESSAGES FOR TRANSMISSION POWER CONTROL BETWEEN DEVICES IN A WIRELESS NETWORK, AND DEVICES FOR THE SAME

CROSS-REFERENCE TO RELATED APPLICATIONS

Pursuant to 35 U.S.C. 119(a) and 119(e), this application claims the benefit of U.S. Provisional Patent Application No. 61/155,503, filed on Feb. 25, 2009, and also claims the benefit of earlier filing date and right of priority to Korean Patent Application No. 10-2009-0119813, filed on Dec. 4, 2009, the contents of which are all hereby incorporated by reference herein in their entirety.

BACKGROUND OF THE INVENTION

1. Field of the Invention

The present invention relates to a wireless communication system, and more particularly, to a method of controlling transmission power for link-adaptive data transmission in a wireless communication system and user devices for the method.

2. Discussion of the Related Art

Recently, Bluetooth and wireless personal area network (WPAN) technologies have been developed, which form a wireless network between a relatively small number of digital devices in limited places such as homes or small companies to allow audio or video data to be exchanged between the devices. The WPAN can be used for information exchange between a relatively small number of digital devices in a relatively close distance, and enables low power and low-cost communication between the digital devices. IEEE 802.15.3 (Wireless Medium Access Control (MAC) and Physical Layer (PHY) Specifications for High Rate Wireless Personal Area Networks (WPANs)) approved on Jun. 12, 2003 defines specification of a MAC layer and a physical (PHY) layer of high rate WPAN.

FIG. 1 is a brief diagram illustrating an example of a wireless private access network (WPAN).

As illustrated in FIG. 1, the WVAN is a network configured between personal devices within a limited space such as home, and allows information to be exchanged between applications without seamlessness by configuring a network through direct communication between devices. Referring to FIG. 1, the WPAN includes two or more user devices 11 to 15, one of which acts as a coordinator 11. The coordinator 11 provides basic timing of the WPAN and serves to control quality of service (QoS) requirements. Examples of the user devices include computers, PDAs, notebook computers, digital TVs, camcorders, digital cameras, printers, mikes, speakers, headsets, bar-code readers, displays, and cellular phones. All digital devices can be used as the user devices.

The WPAN is not predesigned but is an ad hoc network (hereinafter, referred to as 'piconet') formed if necessary without assistance of a central infrastructure. A procedure of forming one piconet will be described in detail. The piconet starts as a random device that can be operated as a coordinator performs the function of the coordinator. All devices perform scanning before associating with the existing piconet or starting a new piconet. Scanning means that a device collects and stores information of channels and searches whether the existing piconet exists. A device that has been commanded from an upper layer to start a piconet forms a new piconet without associating with a piconet previously formed on a random channel. The device starts a piconet by selecting a channel having little interference based on data acquired during scanning and broadcasting a beacon through the selected channel. In this case, the beacon means timing allocation information, information of other devices within a piconet, and control information broadcasted by the coordinator to control and manage the piconet.

FIG. 2 is a diagram illustrating an example of a superframe used in a piconet. Timing control in the piconet is basically performed based on superframes. Referring to FIG. 2, each superframe starts by means of the beacon transmitted from the coordinator. A contention access period (CAP) is used to allow devices to transmit commands or asynchronous data based on contention. A channel time allocation period includes a management channel time block (MCTB) and a channel time block (CTB). The MCTB is a period where control information can be transmitted between a coordinator and a device or between devices. The CTB is a period where asynchronous data or isochronous data can be transmitted between a device and a coordinator or between other devices. For each superframe, the number, length and location of CAPs, MCTBs, and CTBs are determined by the coordinator and transmitted to other devices within the piconet through the beacon.

When a random device within the piconet needs to transmit data to the coordinator or other device, the device requests the coordinator to allocate channel resources for data transmission, and the coordinator allocates the channel resources to the device within the range of available channel resources. If the CAP exists within the superframe and the coordinator accepts data transmission in the CAP, the device can transmit data of small capacity through the CAP without being allocated with channel time from the coordinator.

If the number of devices within the piconet is small, since channel resources for data transmission from each device are sufficient, no problem occurs in allocation of channel resources. However, if channel resources are insufficient due to a large number of devices, or if data of large capacity such as moving pictures are transmitted, a problem may occur in that channel resources are not allocated to the other devices even though the other devices have data to be transmitted, whereby communication cannot be performed.

Also, during data communication between two or more devices that belong to the WVAN, communication quality may be deteriorated depending on the statuses of the devices, such as an obstacle occurring between the devices and interfering with communication, change of the distance or location between the devices, and interference caused by another neighboring device.

In this respect, various methods for efficiently performing data communication between devices constituting WVAN without any problem are being studied.

SUMMARY OF THE INVENTION

Examples of a method for link adaptation between devices of a wireless network include an unequal error protection (UEP) method, a beam searching method, an HRP mode and/or LRP mode adjustment method, and a transmission power control method. At least one of the aforementioned link adaptation methods can be used depending on a status of the device. Particularly, if strength of a received signal is varied, the device can perform link adaptation through the transmission power control method.

According to the general transmission power control method, a receiving device transmits a transmission power control request message of a MAC command type to a transmitting device, and the transmitting device controls the transmission power in response to the request message. At this time, in order to transmit the request message, the receiving device should receive channel resources for transmission of the message from a coordinator belonging to the wireless network. Since the receiving device which has not received channel resources for data transmission from the coordinator should transmit a channel resource allocation request message to the coordinator for transmission power control and receive separate channel resources, a problem occurs in that it is difficult to immediately control the transmission power. Also, a problem occurs in that the receiving device can perform a transmission power control request only after receiving channel resources of given capacity from the coordinator.

Accordingly, the present invention is directed to a method of exchanging messages for transmission power control between devices in a wireless network and devices for the same, which substantially obviate ones or more problems due to limitations and disadvantages of the related art.

An object of the present invention is to provide a method of exchanging messages, in which a receiving device can request a transmitting device of immediate transmission power control in accordance with received signal strength without interference with a coordinator.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of exchanging messages for link recommendation at a receiving device in a wireless network comprises receiving a first data packet from a transmitting device; and transmitting link recommendation information to the transmitting device, wherein the link recommendation information comprises transmit power control (TPC) information for controlling transmission power to be used for transmission of a second data packet in the transmitting device.

The method according to the present invention further comprises receiving link recommendation request information from the transmitting device, wherein the link recommendation request information is to request link recommendation.

The link recommendation request information is included in a MAC extension header of a second data packet received from the transmitting device.

The link recommendation information is included in an ACK packet transmitted in response to the second data packet. Preferably, the link recommendation information is included in a MAC extension header of the ACK packet.

The MAC extension header comprises a extension control field comprising control information, a type field indicating a type of data included in sub-packets constituting a MAC packet, an low-rate physical (LRP) antenna direction tracking (ADT) feedback field comprising ADT feedback information for obtaining an optimized transmission pattern during future signal transmission in an LRP unidirectional mode, an ACK group field comprising information indicating whether preceding sub-packets exist and at least one of a clock field comprising clock count information of video data or audio data.

The extension control field comprises a link mode field indicating a type of link recommendation, a high-rate physical (HRP) mode field indicating a recommended HRP mode to be used at the transmitting device, a LRP mode field indicating a recommended LRP mode to be used at the transmitting device and a TPC field comprising the TPC information.

The link mode field indicates any one of "link recommendation is not being requested", "link recommendation request" and "link recommendation response".

In according to the present invention, the link recommendation information is transmitted to the transmitting device without a request for the link recommendation information from the transmitting device. And, the link recommendation information is included in an ACK packet transmitted in response to a second data packet received from the transmitting device.

The link recommendation information is determined based depending on a the result of channel status assessment for a channel on which the first data packet is received.

In according to the present invention, the TPC information comprises a value indicating a recommendation for controlling transmission power in the transmitting device.

The value indicating the recommendation indicates that no change of a transmission power is recommended. On the other hand, the value indicates that increase of a transmission power is recommended by a predetermined amount. On the other hand, the value indicates that decrease of a transmission power is recommended by a predetermined amount.

In according to the present invention, the transmit power control (TPC) information is determined depending on a receiving strength.

In another aspect of the present invention, a receiving device in a wireless network comprises a transmitting module, a receiving module receiving a first data packet from a transmitting device; and a control module generating link recommendation information and controlling the transmitting module to transmit the link recommendation information to the transmitting device, wherein the link recommendation information comprises transmit power control (TPC) information for controlling transmission power to be used for transmission in the transmitting device.

In still another aspect of the present invention, a method of exchanging messages at a transmitting device in a wireless network comprises transmitting a first data packet to a receiving device and receiving link recommendation information from the receiving device, wherein the link recommendation information comprises transmit power control (TPC) information for controlling transmission power to be used for transmission.

In further still another aspect of the present invention, a transmitting device in a wireless network comprises a receiving module, a transmitting module transmitting a first data packet to a receiving device and a control module receiving link recommendation information including transmit power control (TPC) information for controlling transmission power to be used for transmission from the receiving device through the receiving module, and controlling the transmission power in accordance with the TPC information.

The aforementioned embodiments are only a part of the preferred embodiments of the present invention, and various embodiments on which technical features of the present invention are reflected can be devised and understood by the person with ordinary skill in the art based on the detailed description of the present invention, which will be described later.

According to the embodiment of the present invention, the WVAN receiving device can transmit a transmission power control request message for link adaptation to the transmitting device through ACK/NACK signals even without separate channel resource allocation request to the coordinator.

Accordingly, the device can perform immediate transmission power control based on variation of received signal strength varied depending on its status. Also, the transmission power can be controlled by a link adaptation method between devices that transmit and receive signals without interference of the coordinator.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 16 is a diagram illustrating an example of a MAC header format transmitted from a WVAN device according to one embodiment of the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, structures, operations, and other features of the present invention will be understood readily by the preferred embodiments of the present invention, examples of which are illustrated in the accompanying drawings. Embodiments described later are examples in which technical features of the present invention are applied to a wireless video area network (WVAN) which is a kind of a WPAN.

Figure 1:
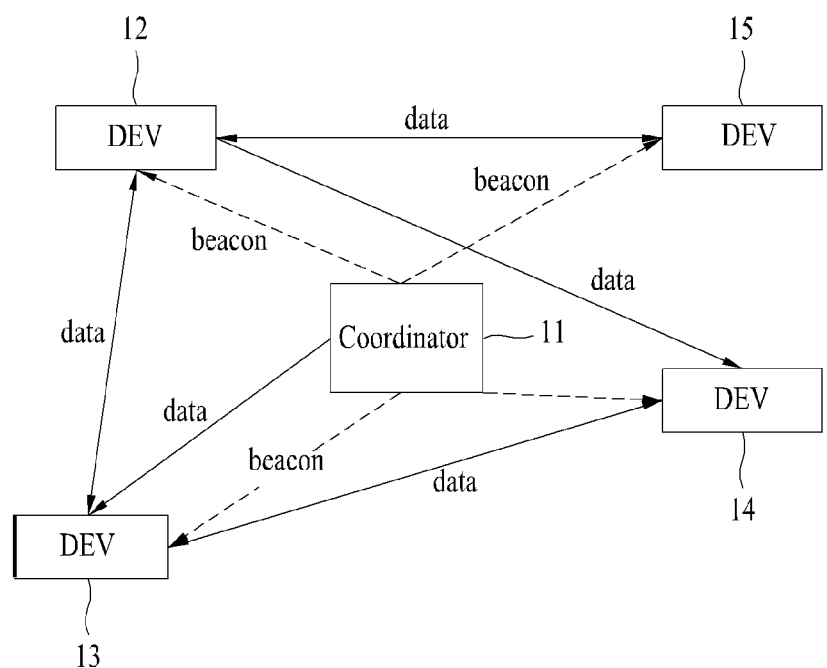
FIG. 1 is a diagram illustrating an example of a WPAN.
Figure 2:
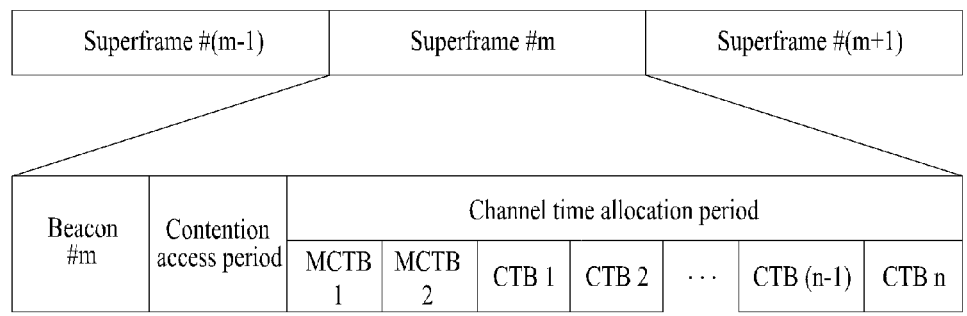
FIG. 2 is a diagram illustrating an example of a superframe used in a piconet.
Figure 3:
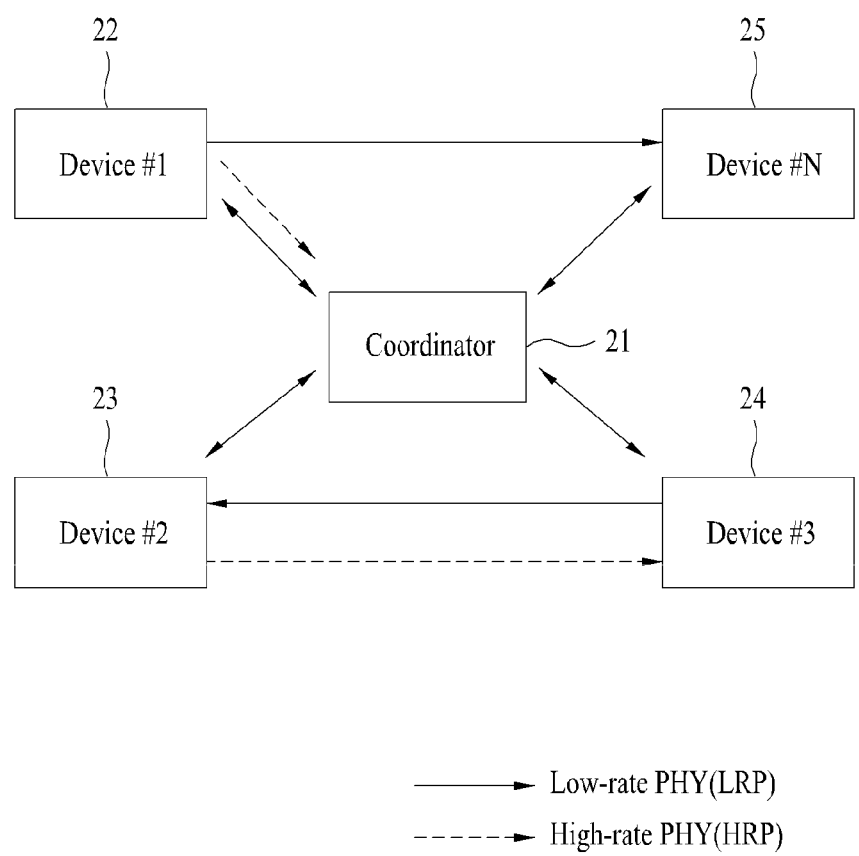
FIG. 3 is a diagram illustrating an example of a WVAN.

FIG. 3 is a diagram illustrating an example of a WVAN. In the same manner as illustrated in FIG. 1, a WVAN of FIG. 3 includes two or more user devices 22 to 25, one of which acts as a coordinator 21. The coordinator 21 provides basic timing of the WVAN, maintains a track of devices belonging to the WVAN, and serves to control quality of service (QoS) requirements. The coordinator performs its function and at the same time serves as one device belonging to the WVAN. Other devices 22 to 25 different from the coordinator 21 can start stream connection.

One of the differences between the WVAN illustrated in FIG. 3 and the WPAN of FIG. 1 is that the WVAN of FIG. 3 supports two kinds of physical (PHY) layers. Namely, the WVAN supports physical layers, high-rate physical (HRP) layer and low-rate physical (LRP) layer. The HRP layer is a physical layer that can support a data transmission rate of 1 Gb/s or greater, and the LRP layer is a physical layer that supports a data transmission rate of several Mb/s. The HRP layer is highly directional, and is used for transmission of isochronous data streams, asynchronous data, MAC command and A/V control data through unicast connection. The LRP layer supports a directional or omni-directional mode and is used for transmission of beacon, asynchronous data, MAC command through unitcast or broadcasting. The coordinator 21 can transmit or receive data to and from other device using the HRP and/or LRP layer. The other devices 22 to 25 of the WVAN can also transmit or receive data using the HRP and/or LRP layer.

Figure 4:
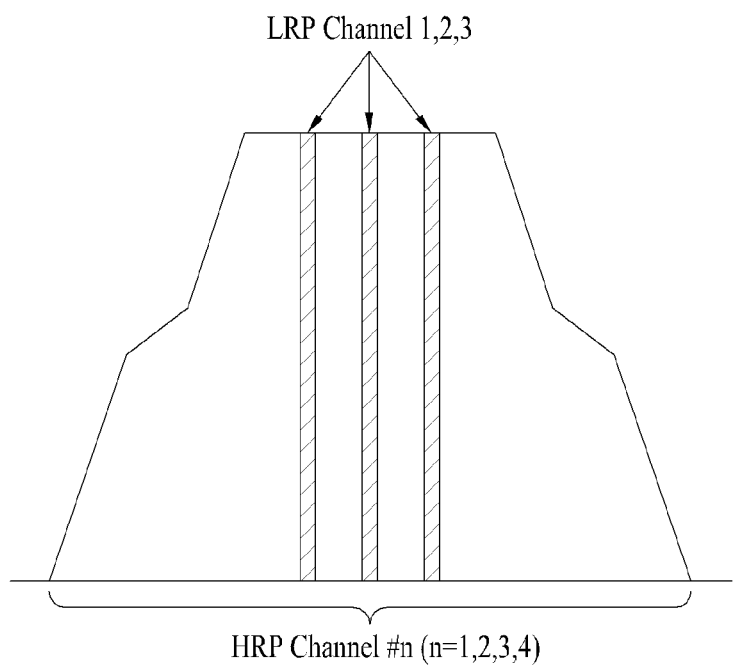
FIG. 4 is a diagram illustrating a frequency band of HRP channels and LRP channels used in a WVAN.

FIG. 4 is a diagram illustrating a frequency band of HRP channels and LRP channels used in a WVAN. The HRP layer uses four channels of a bandwidth of 2.0 GHz in a band of 57 to 66 GHz, and the LRP layer uses three channels of a bandwidth of 92 MHz. As illustrated in FIG. 4, the HRP channels and the LRP channels share a frequency band and are used respectively by a TDMA mode.

Figure 5:
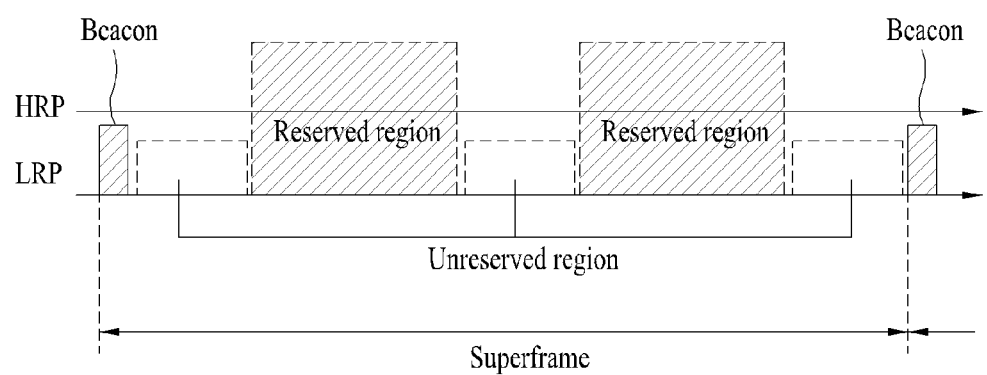
FIG. 5 is a diagram illustrating an example of a structure of a superframe used in a WVAN.

FIG. 5 is a diagram illustrating an example of a structure of a superframe used in a WVAN. Referring to FIG. 5, each superframe includes a beacon region where a beacon is transmitted, a reserved region allocated to a random device by the coordinator in accordance with a request of the devices, and an unreserved region not allocated by the coordinator but transmitting and receiving data between the coordinator and device or between devices in accordance with a contention based mode, wherein each of the regions is time divided. The beacon includes timing allocation information in a corresponding superframe, and management and control information of the WVAN. The reserved region is used to transmit data from a device, to which channel time is allocated by the coordinator in accordance with a channel time allocation request of the device, to other device. Command, data streams, asynchronous data, etc. can be transmitted through the reserved region. If a specific device transmits data to other device through the reserved region, the HRP channel is used. If the device that receives the data transmits ACK/NACK signal of the received data, the LRP channel is used. The unreserved region can be used to transmit control information, MAC command, or asynchronous data between the coordinator and the device or between the devices. In order to prevent data collision between the devices in the unreserved region, a carrier sense multiple access (CSMA) mode or a slotted Aloha mode can be used. In the unreserved region, the data can be transmitted through the LRP channel only. If there are many kinds of control information or commands to be transmitted, the reserved region can be set in the LRP channel. In each superframe, the length and the number of reserved regions and unreserved regions can be varied per superframe and are controlled by the coordinator.

Figure 6:
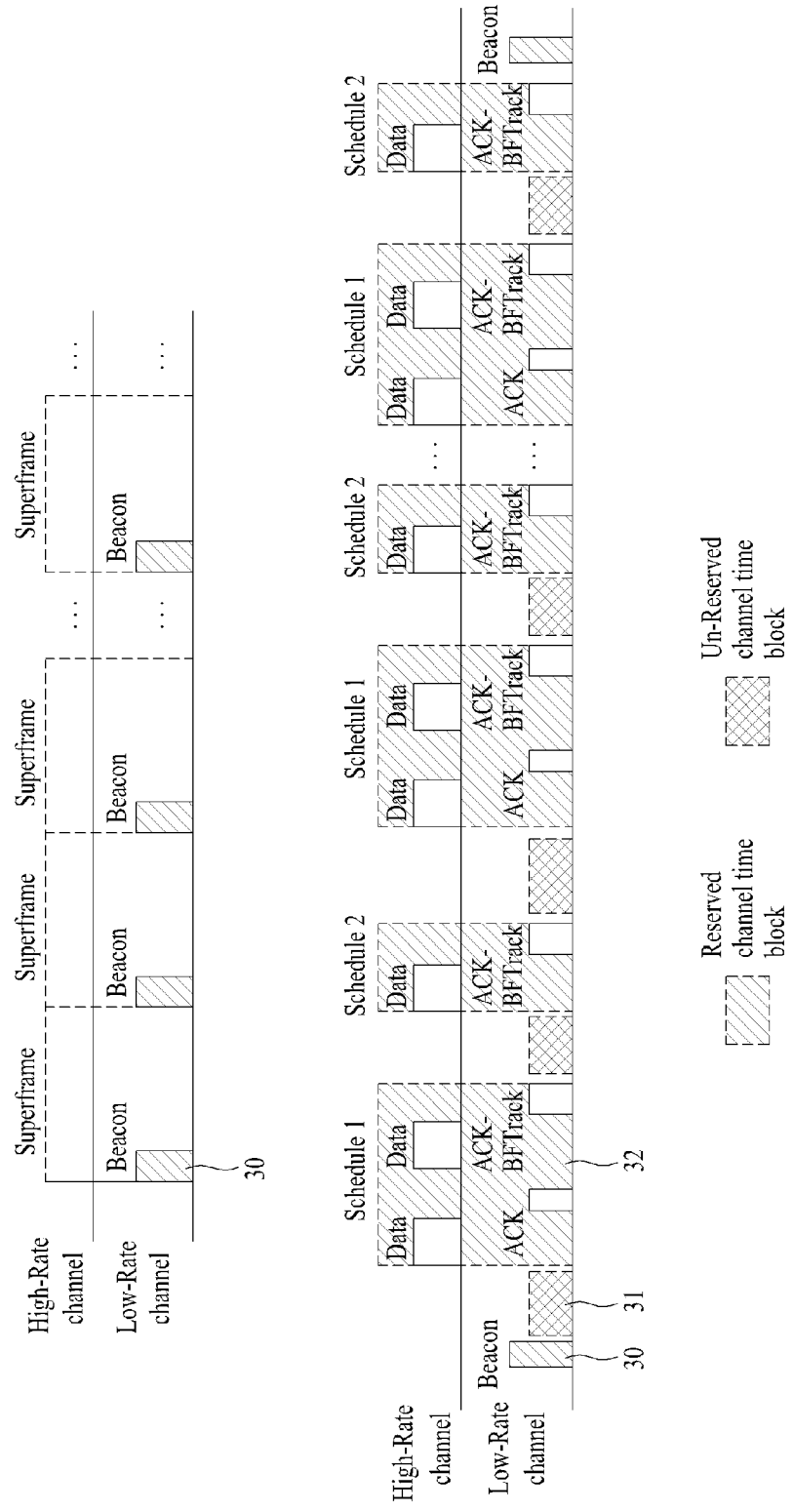
FIG. 6 is a diagram illustrating another example of a structure of a superframe used in a WVAN.

FIG. 6 is a diagram illustrating another example of a structure of a superframe used in a WVAN. Referring to FIG. 6, each superframe includes a beacon field 30 where a beacon is transmitted, a reserved channel time block 32, and an unreserved channel time block 31. Each of the channel time blocks (CTB) is time-divided into a HRP region to which data are transmitted through the HRP layer and a LRP region to which data are transmitted through the LRP layer. The beacon 30 is periodically transmitted by the coordinator to identify a beginning part of each superframe, and includes scheduled timing information and management and control information of the WVAN. The device can exchange data in the network through the timing information and management/control information included in the beacon.

In the HRP region, the reserved CTB field can be used to transmit data from a device, to which channel time is allocated by the coordinator in accordance with a channel time allocation request of the device, to other device. If a specific device transmits data to other device through the reserved CTB field, the HRP channel is used. If the device that receives the data transmits ACK/NACK signal of the received data, the LRP channel is used.

The unreserved CTB field can be used to transmit control information, MAC command, or asynchronous data between the coordinator and the device or between the devices. In order to prevent data collision between the devices in the unreserved CTB field, a carrier sense multiple access (CSMA) mode or a slotted Aloha mode can be used. If there are many kinds of control information or commands to be transmitted, the reserved region can be set in the LRP channel. In each superframe, the length and the number of reserved CTB fields and unreserved CTB fields can be varied per superframe and are controlled by the coordinator.

Furthermore, although not shown in FIG. 6, each superframe includes a contention-based control period (CBCP) located next to the beacon to transmit urgent control/management messages. The length of the CBCP is set so as not to exceed a given threshold value mMAXCBCPLen.

Figure 7:
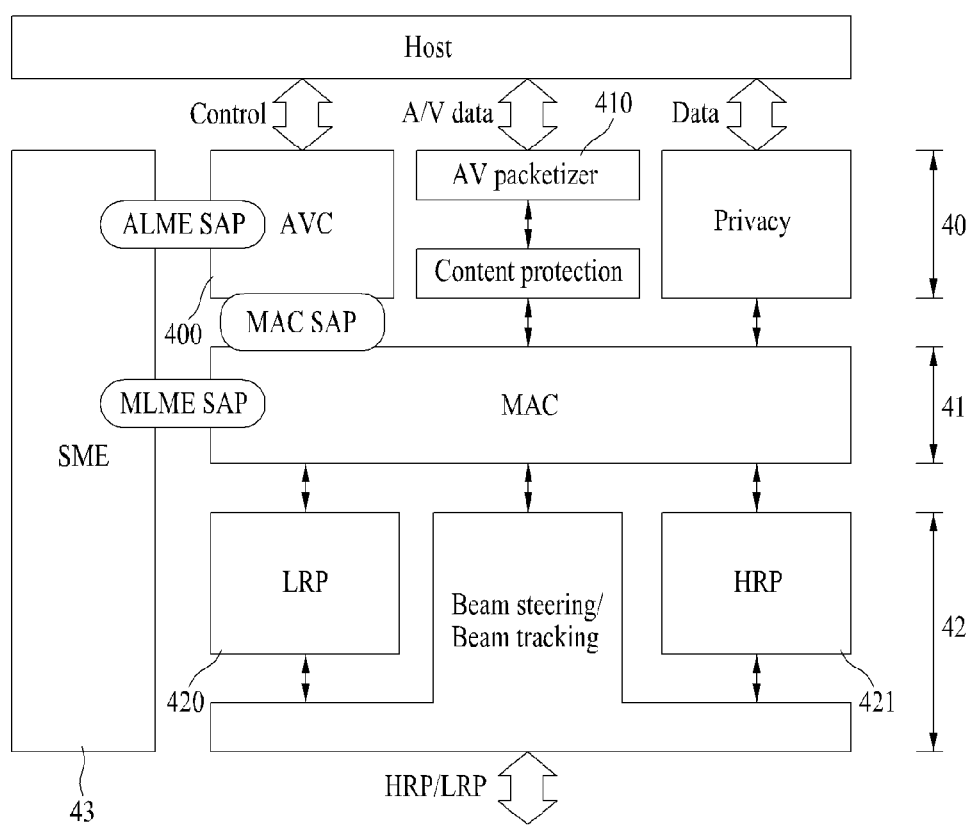
FIG. 7 is a diagram illustrating a protocol layer structure implemented in a device of a WVAN.

FIG. 7 is a diagram illustrating a protocol layer structure implemented in a device of a WVAN.

Referring to FIG. 7, a communication module of each device included in the WVAN can include four layers depending on its function. Generally, the communication module includes an adaptation sublayer 40, a MAC layer 41, a PHY layer 42, and a station management entity (SME) layer 43. In this case, a station is a device for identifying the coordinator, and the station management entity (SME) means a device management entity (DME). The station management entity (SME) is a layer independent entity that controls a lower layer and collects status information of device from each layer. The station management entity SME includes entities that manage each layer of the communication module. In this case, an entity that manages the MAC layer will be referred to as a MAC layer management entity (MLME), and an entity that manages the adaptation layer will be referred to as an adaptation layer management entity (ALME).

The adaptation sublayer 40 includes an AVC protocol 400 and an A/V packetizer 410. The AVC protocol 400 is an upper layer that performs device control and streaming connection for A/V data transmission between a transmitting device and a receiving device. The A/V packetizer 410 formats A/V data for HRP data service.

The MAC layer 41 takes the role in link setup, connection or non-connection, and channel access to a lower layer of a material transmission protocol, and also takes the role in reliable data transmission. In other words, the MAC layer 41 serves to transmit a control/data message or control a channel.

The PHY layer 42 directly processes A/V data, or the A/V data may be processed simultaneously by the PHY layer 42 and the MAC layer 31. The PHY layer is responsible for the task to convert a message requested from the upper layers such as the adaptation layer 30 and the MAC layer 41, so that the message can be sent and received between devices by the PHY layer. Also, the PHY Layer includes the aforementioned two kinds of physical layers, HRP layer 420 and LRP layer 421.

The layers of the device provide services such as a high rate service, a low rate service, and a management service. The high rate service is used for video, audio and data transfer, and the low rate service is used for transmission of audio data, MAC command, and asynchronous data of small capacity. The respective layers transmit and receive a simple message to and from each other before a process of data exchange is performed between the respective layers. The message exchanged between such different layers is referred to as primitive.

If the WVAN having the aforementioned feature starts, the coordinator belonging to the WVAN selects a specific channel, and two or more devices belonging to the WVAN transmit and receive A/V data through a corresponding channel using a radio link. In order to select an optimized physical layer for performing data transmission and reception between the transmitting device and the receiving device, which belong to the WVAN, the transmitting device and the receiving device perform link assessment and link adaptation. The link may mean the channel or may be similar to the channel. Link assessment is used as the same meaning as channel assessment. For link adaptation, the transmitting device performs link recommendation after performing link assessment.

Meanwhile, the transmitting device is a device that transmits A/V data to another device through channel resources allocated from the coordinator and may be used to refer to the transmitting device in view of signal transmission and reception. The receiving device is a device that receives A/V data from the transmitting device and may be used to refer to the receiving device in view of signal transmission and reception.

A procedure of performing link adaptation between WVAN devices will be described in brief with reference to FIG. 8.

Figure 8:
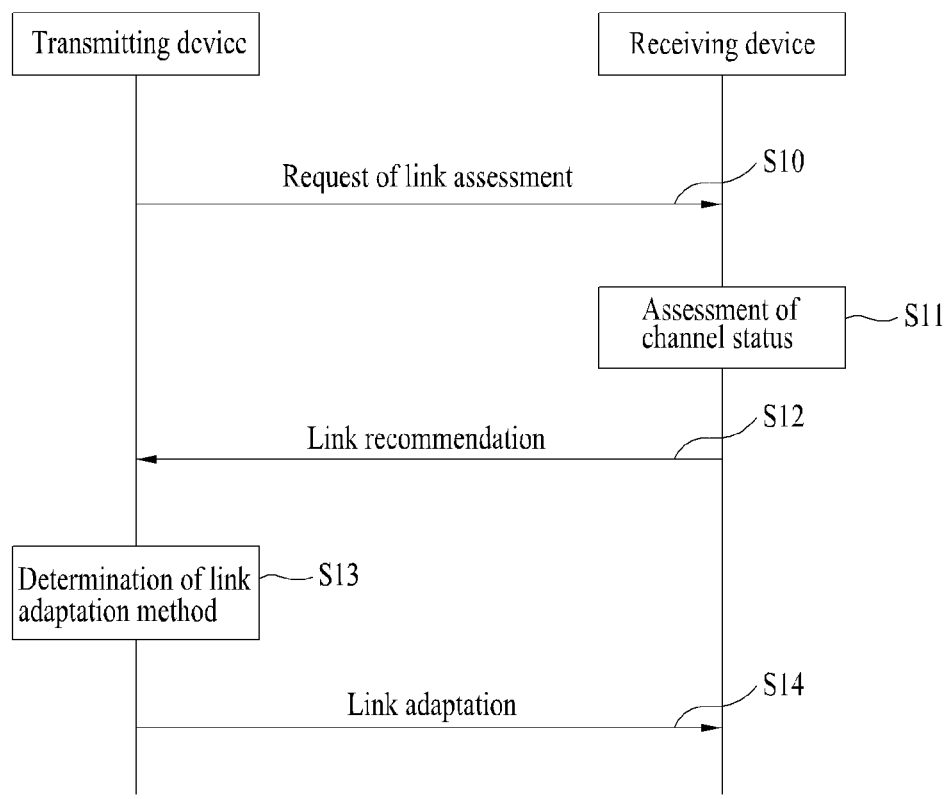
FIG. 8 is a flow chart illustrating an example of a procedure for adaptation to a specific link in a WVAN device according to one embodiment of the present invention.

FIG. 8 is a flow chart illustrating an example of a procedure for performing link adaptation in a WVAN device according to one embodiment of the present invention.

Referring to FIG. 8, the WVAN transmitting device transmits a link assessment request message to the receiving device that transmits and receives A/V data (S10). The link assessment request message is to request the device to perform assessment of the status of a channel currently in service. The receiving device assesses the status of the channel currently in service in response to the link assessment request message (S11). The channel assessment is performed in such a manner that the receiving device measures a packet error rate/ratio (PER), a signal-to-noise ratio (SNR), etc. while receiving at least one packet. The receiving device transmits a link recommendation information to the transmitting device, wherein the link recommendation information includes information acquired by channel assessment (S12). The link recommendation information may be transmitted if there is a link recommendation request from the transmitting device, or may be transmitted even without any link recommendation request.

The transmitting device which has received the link recommendation information determines a link adaptation method for performing link adaptation (S13). Examples of the link adaptation method include an unequal error protection (UEP) method, a beam searching method, an HRP mode and/or LRP mode (hereinafter, referred to as 'HRP/LRP mode') adjustment method, and a transmission power control method. The transmitting device performs link adaptation using at least one of the above methods in accordance with its status (S14).

Each of the steps will be described later in brief.

Figure 9:
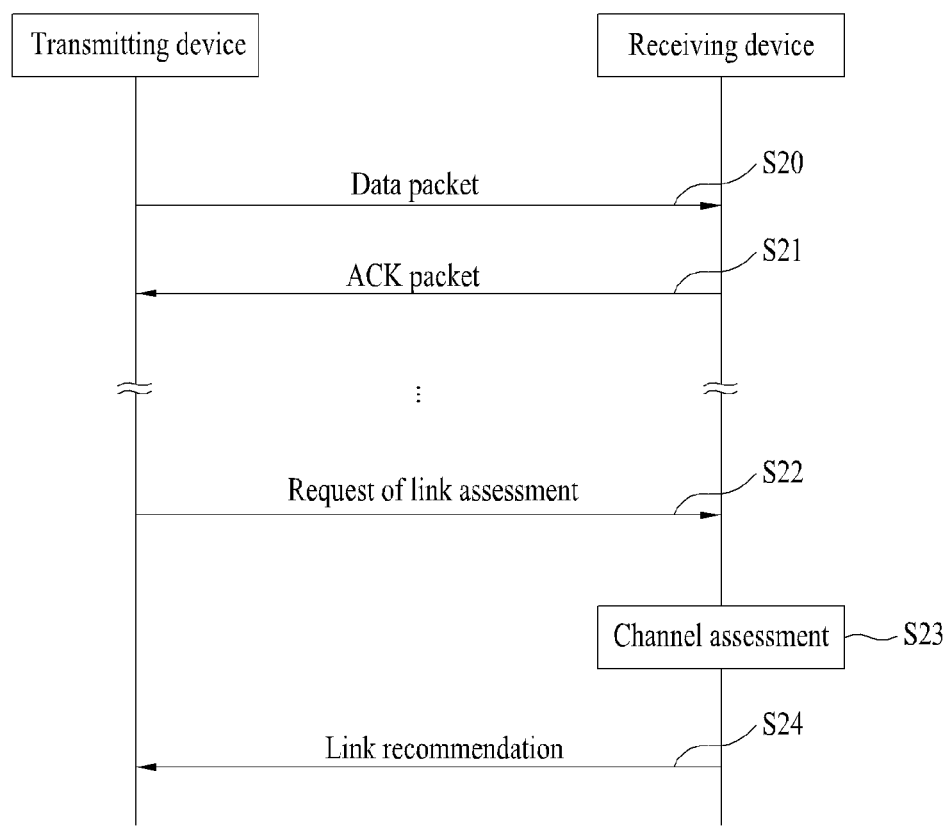
FIG. 9 is a flow chart illustrating an example of link assessment and link recommendation in a WVAN device according to one embodiment of the present invention.

FIG. 9 is a flow chart illustrating an example of link assessment and link recommendation in a WVAN device according to one embodiment of the present invention. Generally, link assessment can be used to assess quality of a channel used by the device.

Referring to FIG. 9, the transmitting device transmits a data packet to the receiving device using a random channel (S20), and the receiving device performs a step (S21) of transmitting ACK packet for responding to the transmitting device at least one time. At this time, the receiving device can collect information of the status of the channel used in steps S20 and S21 or signal quality. If the channel assessment request message is transmitted from the transmitting device (S22), the receiving device performs channel assessment based on the information of signal quality or the channel status (S23). Since the wireless network uses the HRP channel and the LRP channel, the receiving device performs link assessment for at least one of the HRP channel and the LRP channel.

Specifically, link assessment (or channel assessment) can be performed by measuring energy level, noise level, or interference level on the channel for a time interval where data packets are received from the transmitting device. However, parameters that can assess the channel status are not limited to the above parameters, and a frame error rate (FER), a bit error rate (BER), etc., which are measured during data reception can be used as the parameters that can assess the channel status.

The receiving device generates link recommendation information based on the information of the measured channel status (or signal quality) and then transmits the generated link recommendation information to the transmitting device (S24). The link recommendation information can include information of the channel status measured by the receiving device.

During the link recommendation step (S24), as described above, the transmitting device receives the link recommendation information that includes the information of the channel status used for signal transmission and information of a PHY mode to be recommended.

The present invention relates to a link adaptation method of a transmitting device through transmission power control by including transmit power control (TPC) information in the link recommendation information. The link recommendation procedure will be described with reference to FIG. 12.

Next, the transmitting device can perform link adaptation to adjust parameters of the physical layer, thereby acquiring better quality of service (QoS) or higher throughput.

As described above, examples of the link adaptation method include an unequal error protection (UEP) method, a beam searching method, an HRP mode and/or LRP mode (hereinafter, referred to as 'HRP/LRP mode') adjustment method, and a transmission power control method. For link adaptation, the WVAN transmitting device receives channel assessment information and link recommendation information from the receiving device as described in FIG. 8 and uses at least one of the link adaptation methods based on the channel assessment information and the link recommendation information. The link recommendation information includes information required to use the link adaptation method.

Hereinafter, each of the link adaptation methods will be described in brief.

According to the unequal error protection (UEP) method, when a transmission error occurs during uncompressed video data transmission, unequal protection is applied to bits having different importance levels to perform fast recovery. Also, unequal protection is applied to bits having different importance levels through asymmetrical arrangement to better protect bits having high importance, thereby recovering the transmission error. Specifically, the UEP can be performed by applying asymmetrical coding or asymmetrical arrangement mapping for radio transmission of uncompressed video data.

According to the beam searching method, the transmitting device and the receiving device, which have at least one beamforming antenna group, select one or more antenna groups to be used for signal transmission and reception between devices before using beamforming. In a multi input multi output (MIMO) system that uses a plurality of antennas, the WVAN device can use a directional signal for a specific target, i.e., beam, to maximize a signal-to-noise ratio. Beamforming is a type of a smart antenna and means that a directional signal is transmitted to a specific target using a plurality of antennas to enhance efficiency. Hereinafter, the beam searching method will be described in brief with reference to FIG. 10.

Figure 10:
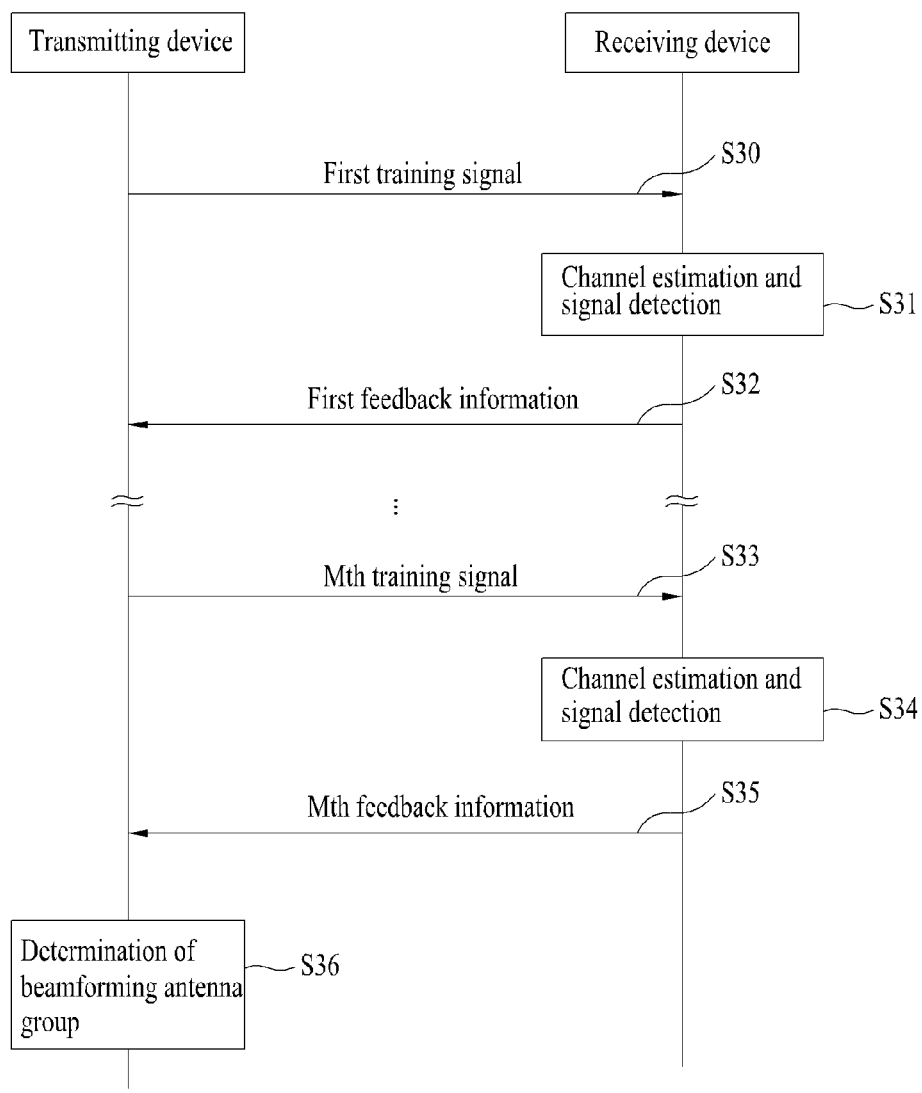
FIG. 10 is a flow chart illustrating an example of a procedure of transmitting and receiving signals to perform a beam searching process between WVAN devices according to one embodiment of the present invention.

FIG. 10 is a flow chart illustrating an example of a procedure of transmitting and receiving signals to perform a beam searching process between WVAN devices according to one embodiment of the present invention. Beam searching is not necessarily required to be performed during initial communication but may be performed if necessary during communication. Also, beam searching includes beam searching in HRP channel and beamforming LRP channel.

Referring to FIG. 10, the WVAN transmitting device transmits a training signal to the receiving device through each antenna group (S30). The receiving device performs channel estimation and signal detection through the training signal (S30). The receiving device transmits feedback information obtained by the result of channel estimation and signal detection to the transmitting device (S32). At this time, it is preferable that training signals transmitted from a plurality of beamforming antenna groups of the transmitting device are sequentially transmitted as illustrated in FIG. 10. In other words, after the first training signal is transmitted through the first beamforming antenna group, the second training signal is transmitted through the second beamforming antenna group, and then the training signals are transmitted from the other beamforming antenna groups in due order. It is also preferable that the steps of transmitting feedback information from the receiving device to the transmitting device are performed in due order in accordance with the training signals transmitted from the transmitting device.

As described above, the training signal and its feedback information may be repeated for throughput detection of each of the plurality of beamforming antenna groups, and at the same time may be repeated several times to measure rank of a channel matrix H (S33, S34, S35). After the steps S33 to S35 are repeated, the transmitting device determines one or more beamforming antenna groups to be used through the feedback information (S36). The transmitting device can select an optimized antenna group among the beamforming antenna groups having throughput of a predetermined reference value or greater based on the detected result. Also, the feedback information transmitted from the receiving device may include strength information of a signal received as a result of the signal detection in step S21 or S24.

Accordingly, the transmitting device can select a beamforming antenna group to be used and also determine an antenna array weight vector (AWV) to be applied to the selected beamforming antenna group. The AWV is determined based on received signal strength indication (RSSI) information between the transmitting device and the receiving device, which perform beamforming.

At this time, the training signal transmitted from the transmitting device is a signal obtained by a predetermined training sequence shared between the transmitting device and the receiving device, and can include identification information of the transmitting device as the case may be.

If a current antenna group is changed to another antenna group through beam searching, beam steering is performed. Beam steering means that a direction of a main loab of a beam pattern is changed by changing the antenna group used to transmit and receive a signal, wherein a radio signal is transmitted and received in the main loab. Beam steering is performed in such a manner that antenna location is changed in radio communication or phase of a radio signal is changed.

The beam searching method is an example of a method of adaptation to a new link, and the training signal and its feedback information in FIG. 10 correspond to the link recommendation request message and the link recommendation information in FIG. 9.

Beam steering through beam searching can be applied if a communication error occurs due to obstacle existing between the WVAN transmitting device and the WVAN receiving device, which transmit and receive a radio signal, or if a radio signal strays from an original pattern where the radio signal is transmitted.

The HRP/LRP mode adjustment means PHY mode adjustment of a channel used by the WVAN transmitting device and the WVAN receiving device, which currently transmit and receive a radio signal. PHY mode adjustment can be used if a communication error occurs due to obstacle existing between the devices, which transmit and receive a radio signal, or if an interference rate increases due to increase of devices that use the same channel. Accordingly, the transmitting device requests the receiving device of recommendation information of HRP mode and LRP mode during link recommendation to change the PHY mode of the current channel, and performs link adaptation in such a manner that the PHY mode is changed to the HRP mode and the LRP mode recommended by the receiving device.

According to the transmission power control method, the WVAN device, which currently transmits a radio signal, controls the transmission power to reduce power consumption and maintain a reliable transmission status. For example, if a physical distance between the devices becomes long, RSSI may become weak. If the physical distance becomes short, RSSI increases but power consumption may occur.

Accordingly, the transmitting device that transmits a signal can increase or decrease the transmission power to correspond to a transmit power control report (TPC) information element (TPC report IE) or a TPC request command transmitted from the receiving device. Alternatively, the receiving device can transmit a transmission power control request message to the transmitting device in a type of MAC command. In this case, the receiving device should request the WVAN coordinator of channel resources to transmit the transmission power control request command.

As described above, a proper one of the various link adaptation methods can be used in accordance with the status of the WVAN device. Hereinafter, an example of a status of a WVAN device according to one embodiment of the present invention during radio signal communication will be described in brief with reference to FIG. 11A to FIG. 11E.

FIG. 11A to FIG. 11E are diagrams illustrating an example that a communication status is deteriorated by a status of a WVAN device according to one embodiment of the present invention.

Figure 11:
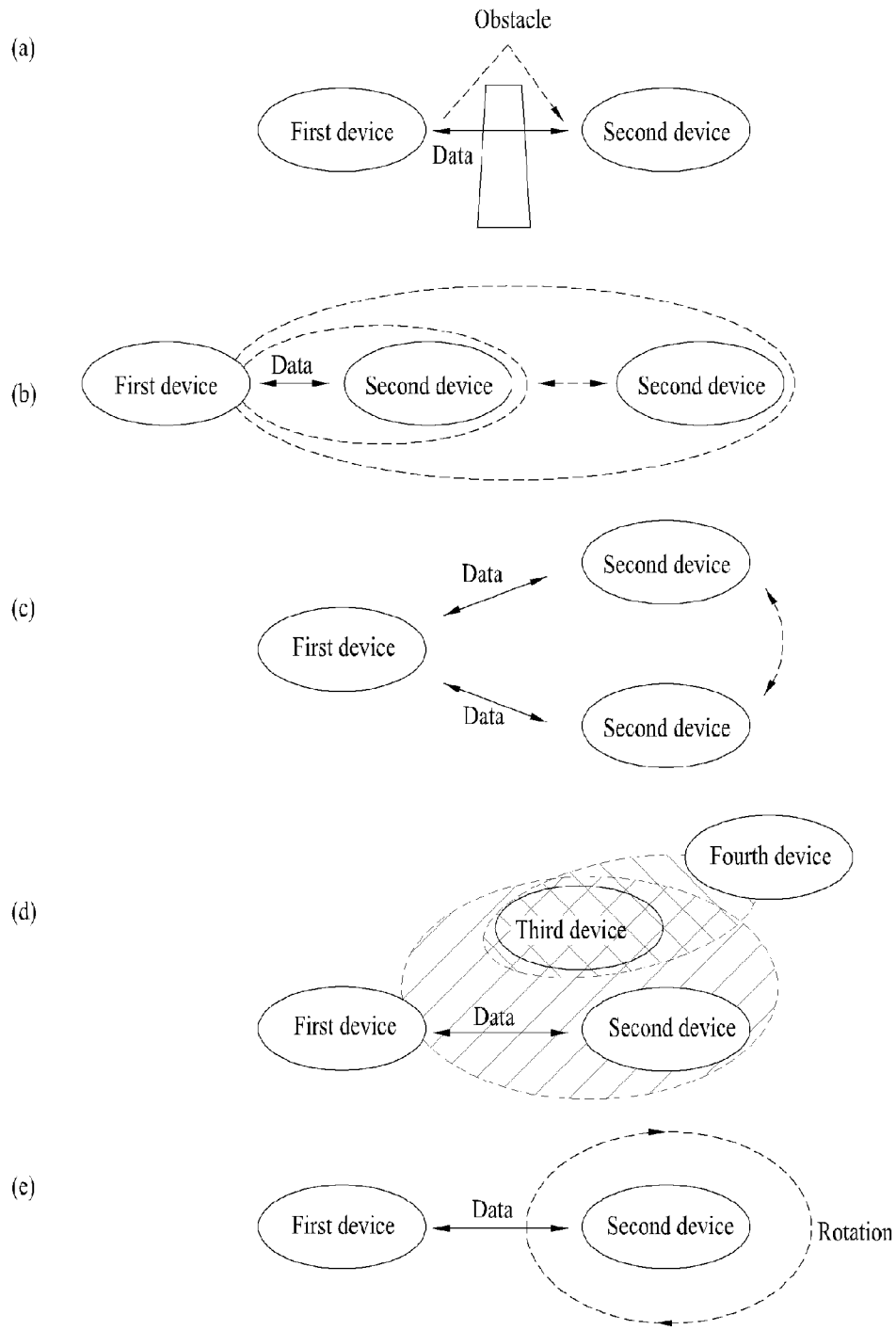
FIG. 11A to FIG. 11E are diagrams illustrating an example that a communication status is deteriorated by a status of a WVAN device according to one embodiment of the present invention.

FIG. 11A illustrates an example that an obstacle exists between WVAN devices that transmit and receive a radio signal. If an obstacle exists in a radio signal path between the devices, a communication error may occur due to signal reflection, etc. Accordingly, a change of a signal transmission path is required. In this case, another signal transmission path having no obstacle is selected by beam searching and beam steering is performed, or link adaptation can be performed using the HRP/LRP mode adjustment method currently in service.

FIG. 11B illustrates an example that a physical distance between a WVAN transmitting device and a WVAN receiving device, which transmit and receive a radio signal, increases or decreases. If the physical distance between the devices increases, RSSI may become weak. If the physical distance between the devices decreases, RSSI increases but power consumption may occur. Accordingly, the transmitting device that transmits a signal in accordance with the embodiment of the present invention can adjust the transmission power to be increased or decreased in accordance with the RSSI caused by the physical distance between the devices.

FIG. 11C illustrates an example that a location of any one of WVAN devices, which transmit and receive a radio signal, is changed. Even though the physical distance between the devices is maintained, if the location of the device is changed as illustrated in FIG. 11C, the signal transmission path is changed to affect the channel status. Accordingly, the transmitting device requests the receiving device to perform beam searching and performs beam steering by selecting another antenna group based on the feedback information transmitted from the receiving device and transmitting a signal.

FIG. 11D illustrates an example that a WVAN device, which transmits and receives a radio signal, is affected by interference due to another device that uses the same channel as the current channel. Even though the status of the current channel is good, if there are many other devices that use the same channel, an interference rate increases due to other devices. Accordingly, the WVAN device can perform HRP/LRP mode adjustment in the current channel.

FIG. 11E illustrates an example that one of WVAN devices that transmit and receive a radio signal is rotated. Even though there is no change in the physical distance between the devices or location of the devices, since a location of a unidirectional antenna is continuously changed by rotation of the device, a communication status is deteriorated. Accordingly, the transmitting device requests the receiving device to perform beam searching and performs beam steering by selecting another antenna group based on the feedback information transmitted from the receiving device and transmitting a signal.

In addition, the communication status may be deteriorated depending on various statuses of the device. In this case, a proper one of the aforementioned link adaptation methods may be selected as the case may be. However, the link adaptation method is not limited to the selected one. Also, two or more link adaptation methods may be used.

As described above, in order to perform link adaptation, the transmitting device can receive link recommendation information, which is required to perform the link adaptation method, from the receiving device during link recommendation.

Hereinafter, the link recommendation method will be described in brief.

The link recommendation method can be divided into an active mode and a passive mode, wherein the active mode is to transmit link recommendation information in response to a request of the transmitting device and the passive mode is to transmit link recommendation information without any request of the transmitting device.

Figure 12:
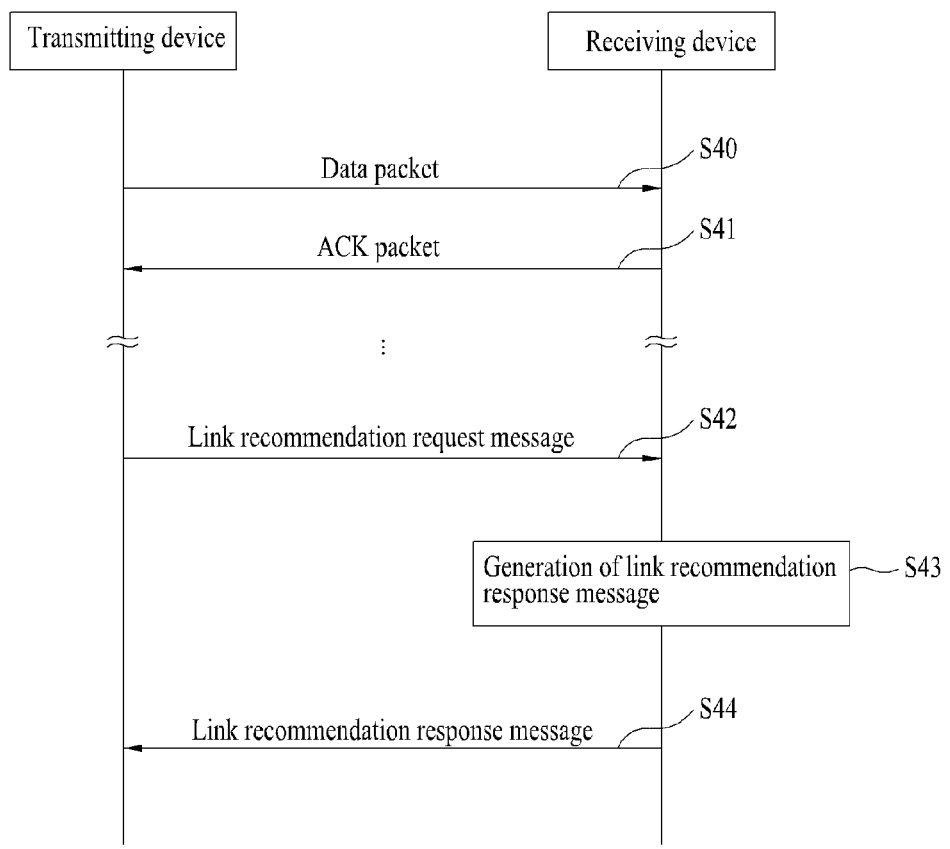
FIG. 12 is a flow chart illustrating an example of a procedure of performing link recommendation between WVAN devices according to one embodiment of the present invention.

FIG. 12 is a flow chart illustrating an example of a procedure of performing link recommendation between WVAN devices according to one embodiment of the present invention. Specifically, FIG. 12 illustrates an example of link recommendation in the active mode.

Referring to FIG. 12, the receiving device receives a data packet from the transmitting device (S40). The receiving device transmits ACK packet in response to the data packet (S41) and generates an information element (IE) for link recommendation during reception. The information element (IE) for link recommendation is generated based on the result of the channel status measured in step S23 of FIG. 9. If a link recommendation request message is transmitted from the transmitting device (S42), the receiving device generates a response message to the request message (S43). The link recommendation request message can be used to refer to the link assessment request message requesting link assessment in FIG. 9. The receiving device can assess the channel status after receiving the link recommendation request message. The response message includes the information element for link recommendation, which is generated based on the channel status or signal quality collected during the step of receiving a data packet.

Afterwards, the receiving device a link recommendation response message to the transmitting device (S44).

Figure 13:
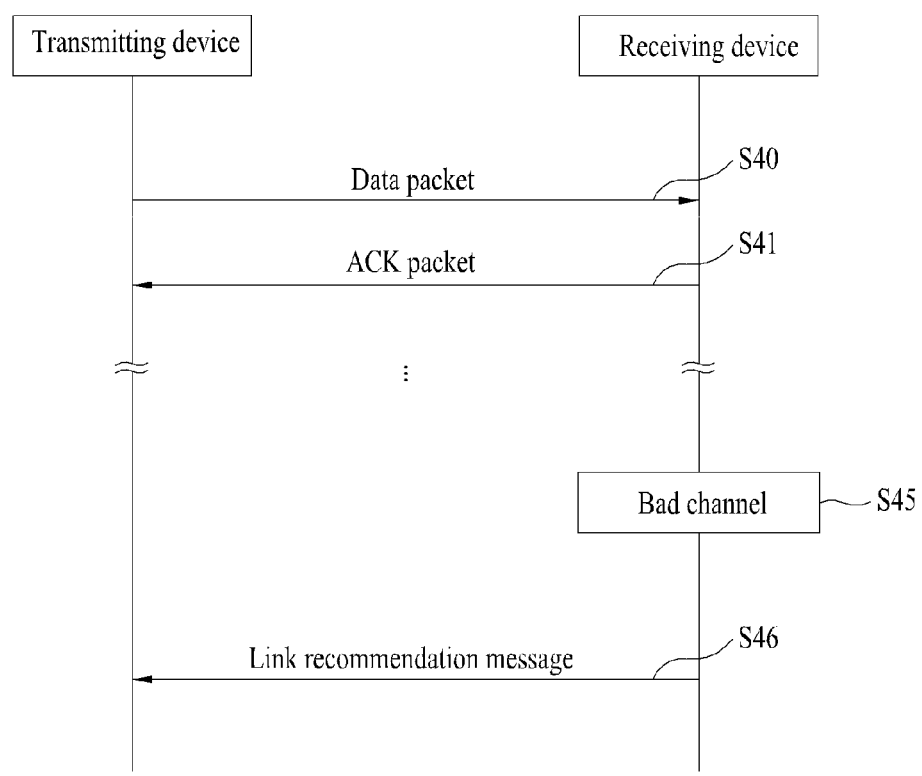
FIG. 13 is a diagram illustrating another example of link recommendation in a WVAN device according to one embodiment of the present invention.

FIG. 13 is a flow chart illustrating another example of a procedure of performing link recommendation between WVAN devices according to one embodiment of the present invention. Specifically, FIG. 13 illustrates an example of link recommendation in the passive mode.

Referring to FIG. 13, in the same manner as FIG. 12, the receiving device receives a data packet from the transmitting device (S40). The receiving device can measure the status of the channel currently in service while repeating the step of transmitting ACK packet in response to the data packet (S41). At this time, if it is determined that the status of the current channel is remarkably deteriorated or RSSI becomes weak (S45), the receiving device transmits a response message, which includes link recommendation information, in accordance with its discretionary determination even though the transmitting device does not transmit the link recommendation request message (S46).

The aforementioned link recommendation method of the active mode and the passive mode can be divided into a normal link recommendation method and a fast link recommendation method in accordance with a data format for transmitting the link recommendation request message and the link recommendation response message.

Examples of the link adaptation method based on the normal link recommendation method include a UEP method, a beam searching method, and an HRP/LRP mode adjustment method. According to the normal link recommendation method, the link recommendation request message and its response message are transmitted in accordance with a type of MAC command. The normal link recommendation method for performing link recommendation using the MAC command uses channel resources separately from data transmission to transmit the MAC command. Also, according to the normal link recommendation method, the transmitting device transmits a transmission power control request message to the receiving device as a separate MAC command and receives TPC information in response to the transmission power control request message to control the transmission power. Alternatively, the receiving device can transmit MAC command requesting transmission power control in accordance with RSSI to the transmitting device.

Accordingly, the transmission power cannot be controlled through the normal link recommendation method.

On the other hand, the fast link recommendation method does not use the MAC command for link recommendation unlike the normal link recommendation method, and transmits a data packet or ACK packet, which includes the link recommendation request message and its response message. Accordingly, the fast link recommendation method may not use separate channel resources to perform link recommendation. Also, since the link recommendation process is performed during data transmission and reception, the fast link recommendation method can be performed faster than the normal link recommendation method.

The present invention relates to a link recommendation method that includes TPC information for link adaptation in the fast link recommendation method.

According to one embodiment of the present invention, examples of the link adaptation method based on the fast link recommendation method include a UEP method, beam searching method, an HRP/LRP mode adjustment method, and a transmission power control method.

Figure 14:
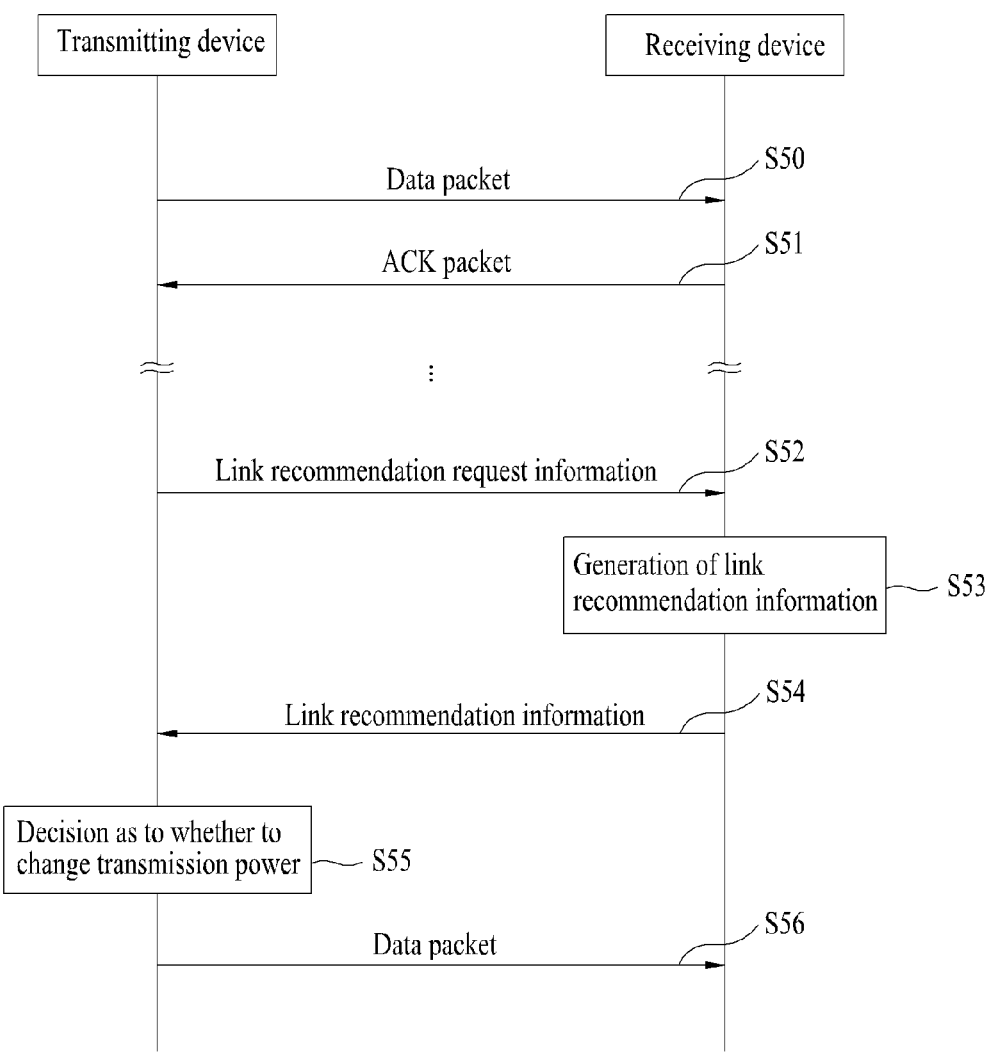
FIG. 14 is a diagram illustrating an example of a link recommendation procedure for transmission power control for link adaptation in a WVAN device according to one embodiment of the present invention.

FIG. 14 is a flow chart illustrating another example of a procedure of performing link recommendation for transmission power control for link adaptation between WVAN devices according to one embodiment of the present invention. Specifically, FIG. 14 illustrates an example of link recommendation in the active mode of the fast link recommendation method.

Referring to FIG. 14, the WVAN transmitting device transmits a data packet to the WVAN receiving device, wherein the data packet includes a normal data packet and a composite data packet (S50). The normal data packet is a data packet that includes a single sub-packet, and the composite data packet is a data packet that includes two to seven multiple sub-packets. If the WVAN transmitting device transmits the composite data packet, it transmits various messages or commands using one data packet or two or more same sub-packets, thereby improving receiving accuracy as compared with the normal data packet.

The receiving device transmits ACK packet to the transmitting device in response to the data packet (S51). At this time, the receiving device can perform assessment of the communication status and the channel status during data reception, and can collect information for defining a proper transmission power value in accordance with received signal strength (or receiving strength). The transmitting device can transmit the data packet to the receiving device, wherein the data packet includes link recommendation request information (S52). At this time, the link recommendation request information according to the embodiment of the present invention includes request information of transmission power control. The link recommendation request information may be used to refer to the link assessment request message requesting link assessment as described in FIG. 9, and the receiving device can assess the channel status after receiving the link recommendation request information.

The receiving device generates link recommendation information in accordance with the result of channel assessment or received signal strength information measured through the step S50 (S53). Also, the receiving device may perform channel assessment after receiving the link recommendation request information.

The receiving device transmits link recommendation information to the transmitting device in response to the link recommendation request information, wherein the link recommendation information includes TPC information (S54). In this case, the link recommendation information is included in the ACK packet to the data packet that includes the link recommendation request information transmitted in step S52. The transmitting device decides whether to control the transmission power in accordance with the TPC information included in the link recommendation information (S55). The transmitting device is not necessarily required to follow transmission power change details included in the TPC recommendation information of the receiving device. If the transmitting device decides to change the transmission power, it is not required that the transmitting device should transmit a separate response message to the receiving device. The transmitting device which has decided whether to change the transmission power transmits data having the changed transmission power or the original transmission power to the receiving device (S56).

In the fast link recommendation method, the transmitting device can transmit link recommendation information without link recommendation request of the transmitting device.

Figure 15:
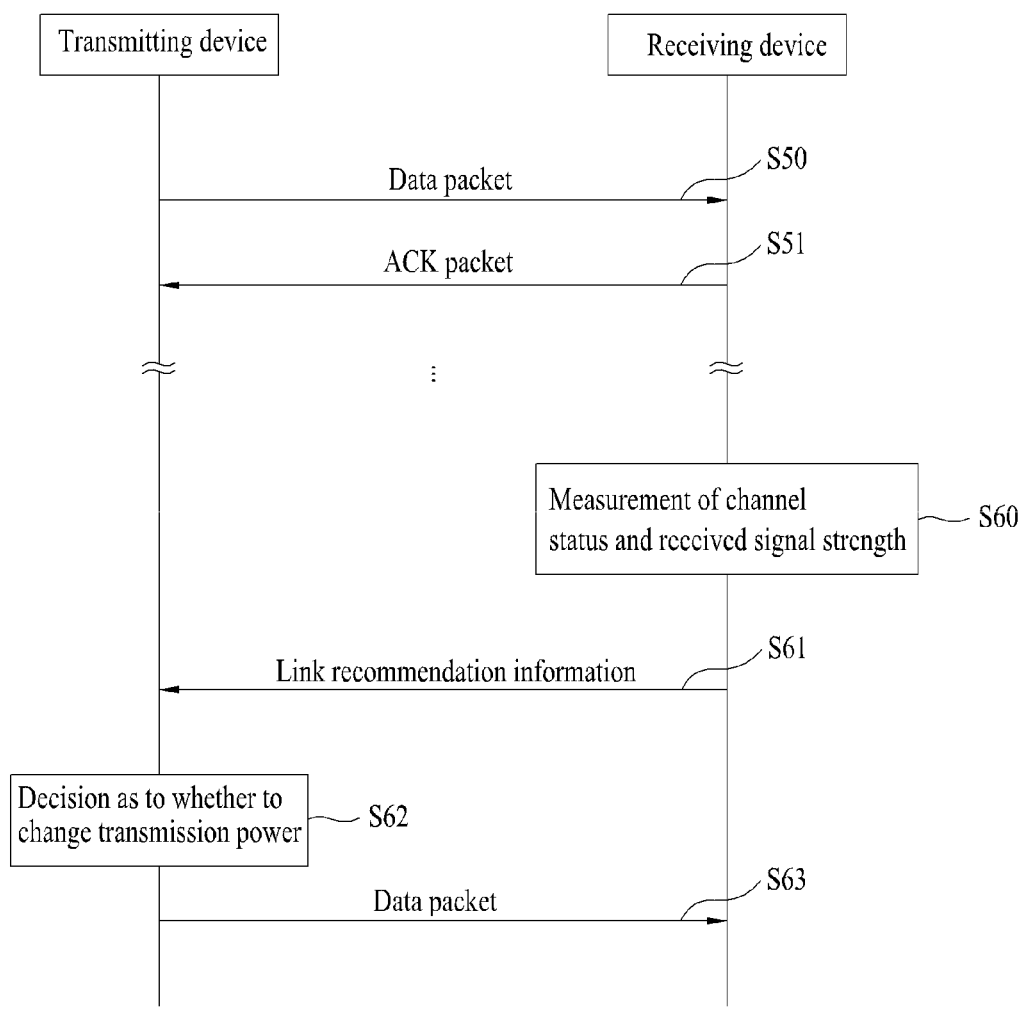
FIG. 15 is a diagram illustrating another example of a link recommendation procedure for transmission power control for link adaptation in a WVAN device according to one embodiment of the present invention.

FIG. 15 is a flow chart illustrating other example of a procedure of performing link recommendation for transmission power control for link adaptation between WVAN devices according to one embodiment of the present invention. Specifically, FIG. 15 illustrates an example of link recommendation in the passive mode of the fast link recommendation method.

Referring to FIG. 15, the WVAN receiving device receives a data packet from the transmitting device, wherein the data packet includes a normal data packet and a composite data packet (S50). And, the WVAN receiving device transmits ACK packet to the WVAN transmitting device in response to the data packet (S51). At this time, the receiving device can perform assessment of the communication status and the channel status during data reception, and can collect information for defining a proper transmission power value in accordance with received signal strength (RSSI) (S60).

In step S60, if the RSSI becomes weak remarkably, or if it is determined that power capacity greater than the required transmission power is required due to too great RSSI, the receiving device transmits link recommendation information to the transmitting device even without link recommendation request (S61). Likewise, the link recommendation information is included in ACK packet to the data packet received in the previous step, and includes TPC information. The transmitting device decides whether to change the transmission power in accordance with the TPC information included in the link recommendation information (S62), and then transmits A/V data to the receiving device (S63).

In the fast link recommendation method, the link recommendation request information is included in the data packet, which includes a MAC header field and a data field, wherein the MAC header includes the link recommendation request message.

The link recommendation information is included in the ACK packet to the data packet transmitted from the transmitting device.

The ACK packet is divided into a directional low-rate physical data unit (LRPDU) ACK packet, an omni-directional LRPDU ACK packet, and a beam-formed LRPDU ACK packet. The directional LRPDU packet includes a packet having payload and a packet having no payload. The directional LRPDU packet is mainly used during transmission of ACK signal or beam-formed LRPDU packet. The directional LRPDU packet having payload can be used during transmission of beam searching feedback information and beamforming feedback information. The omni-directional LRPDU packet can be used during transmission of broadcasting signal or multiple LRP packets. The beam-formed LRPDU packet can be used during transmission of LRP packet at a high data rate.

The ACK packet that includes link recommendation information according to the embodiment of the present invention includes a directional LRPDU ACK packet having a payload field and an omni-directional LRPDU ACK packet. The link recommendation information can be included in an extension control field of the directional LRPDU ACK packet having payload or a MAC extension header of the omni-directional LRPDU ACK packet. This can be determined depending on received data packet type.

However, it is only exemplary that the link recommendation request information is included in the MAC extension header and the link recommendation information is included in the extension control field or the MAC extension header.

Hereinafter, in order to describe an example of a packet type that includes the link recommendation request information and the link recommendation information, an example of the data packet or omni-directional LRPDU ACK packet will be described. The data packet or omni-directional LRPDU ACK packet commonly include a data format that includes a MAC header, an HCS field, and a packet body having a plurality of sub-packets as illustrated in Table 1.

TABLE 1

| MAC header | HCS | Packet Body |

The MAC header can be divided into an HRP MAC header and an LRP MAC header. Hereinafter, the MAC header will be described with reference to FIG. 16. The HCS field is located between the MAC header and the packet body and includes CRCs of 32 bits. The packet body can include minimum single sub-packet to maximum seven sub-packets. The data packet can be divided into a normal data packet and a composite data packet depending on whether the packet body is a single sub-packet or multiple sub-packets. Each sub-packet can be set to have various sizes.

FIG. 16 is a diagram illustrating an example of a MAC header format transmitted from a WVAN device according to one embodiment of the present invention, especially illustrates an example of a MAC header that includes a signal transmitted through HRP and LRP.

Referring to FIG. 16, the HRP MAC header format includes a MAC control header 90, a MAC extension header 91, a security header 92, a video header 93, a CP header 94, and a reserved field 95. The LRP MAC header format includes a MAC control header 90, a MAC extension header 91, a security header 92, a reliable broadcast or multicast (ReBoM) header 96, and a reserved field 95.

The MAC control header 90 includes a protocol of transmitted packet, packet control details such as packet type, identification information identifying a device that transmits a corresponding packet, and identification information identifying a device that receives a corresponding packet.

The MAC extension header 91 includes information of a link having fast transmission speed among links used for data transmission, information of HRP and LRP modes, and one or more ACK groups. The ACK groups respectively correspond to sub-packets included in the packet body field.

The security header 92 includes information identifying a key used for encryption or authentication of data transmitted through a packet.

The video header 93 included in the HRP MAC header only includes information of order and location of video data displayed in the receiving device that receives the video data. The CP header 94 is used to transfer contents protection information of packets, and its type can be implemented in various manners depending on a contents protection method used for corresponding data.

The ReBoM header 96 included in the LRP MAC header only includes forward LRP packets if a bit within the ReBoM header is set to 1. Also, the ReBoM header 96 includes an ACK response bitmap region indicating whether a device that transmits the forward LRP packets currently joins a ReBoM process.

The link recommendation request information that includes TPC information according to the embodiment of the present invention and the link recommendation information are included in the MAC extension header 91 illustrated in FIG. 16.

Figure 17:
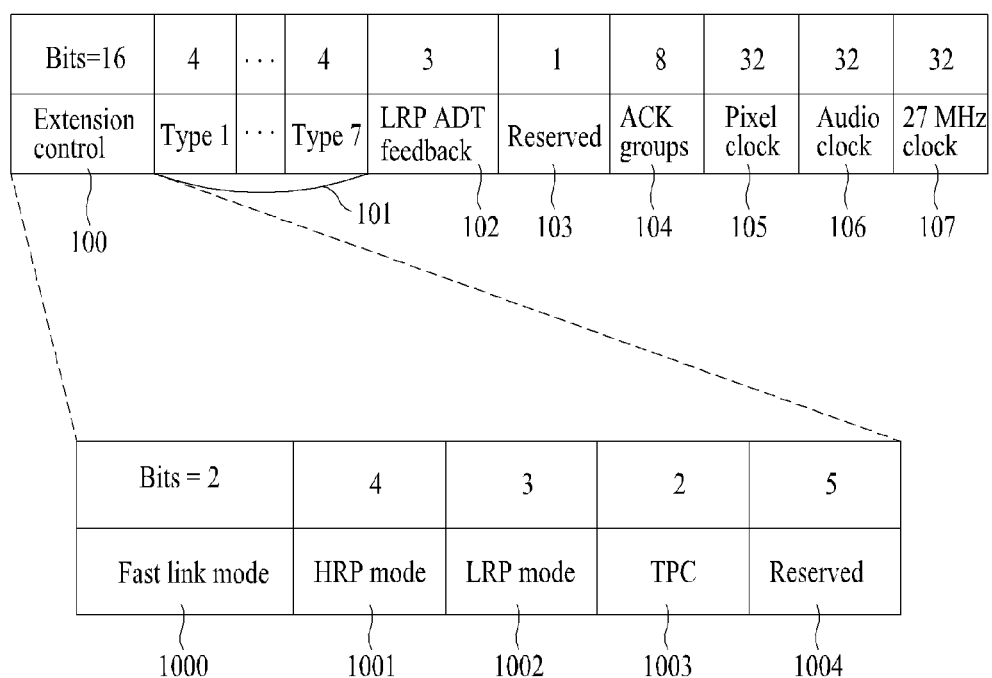
FIG. 17 is a diagram illustrating an example of a MAC extension header format transmitted from a WVAN device according to one embodiment of the present invention.

FIG. 17 is a diagram illustrating an example of a MAC extension header format transmitted from a WVAN device according to one embodiment of the present invention.

Referring to FIG. 17, the MAC extension header includes an extension control field 100, a type field 101 including information of a data type included in sub-packets constituting MAC packet, an LRP ADT feedback information field 102, a reserved field 103, an ACK group information field 104, a pixel clock field 105 including clock information of video data (for example, pixel), an audio clock field 106 including clock information of audio data, and 27 MHz clock field 107 including clock information of 27 MHz in a source device.

The type field 101 includes information indicating a type of data included in sub-packets constituting a packet together with the MAC header. For example, if a bit value set in the field 101 is '0', it indicates that the MAC command is transmitted through the sub-packets. If a bit value set in the field 101 is '1', it indicates that data are transmitted through the sub-packets. If a bit value set in the field 101 is '2', it indicates that audio signal is transmitted through the sub-packets. If a bit value set in the field 101 is '3', it indicates that video signal is transmitted through the sub-packets. If a bit value set in the field 101 is '4', it indicates that a sequence for beam tracking is included in the sub-packets. If a bit value set in the field 101 is '5~F', it indicates that use of the field is reserved.

The LRP ADT feedback field 102 includes antenna direction tracking (ADT) feedback information for obtaining an optimized transmission pattern during future signal transmission in an LRP unidirectional mode. The bit value set in the LRP ADT feedback field 102 represents index information of an optimized transmitting device antenna, which is measured from an LRPDU of a finally received short-omni LRP preamble or an ADT postamble field of a preceding unidirectional ACK packet.

The ACK group field 104, as illustrated in Table 2, includes one or more fields including information of sub-packets and a field including information as to whether packet check sequence (PCS) is used. Table 2 illustrates an example of a composite data packet.

TABLE 2

| Bits:1 | 1 | ... | 1 | 1 |
|---|---|---|---|---|
| Sub-packet 1 | Sub-packet 2 | ... | Sub-packet | 1sb PCS |

Since one packet includes a MAC header and a packet body that includes maximum seven sub-packets, maximum seven fields can be provided as fields that include information of sub-packets constituting the ACK group 104.

The sub-packet information field constituting the ACK group 104 includes information indicating whether preceding sub-packets exist. For example, if 1 bit is allocated to each field as illustrated in Table 1 and preceding sub-packets exist, the bit value of the sub-packet field is set to '1'. If no preceding sub-packets exist, the bit value of the sub-packet field is set to '0'. In this case, the bit value set in the first sub-packet field is always '0'.

The PCS field includes information indicating whether a packet check sequence (PCS) is used in the step of determining whether the sub-packets are received exactly. For example, in a state that 1 bit is allocated to the PCS field as illustrated in Table 1, if the PCS is used, the bit value is set to '1'. If not so, the bit value is set to '0'.

Maximum five ACK groups can be defined. The receiving device that receives a data packet including the aforementioned ACK group information transmits ACK/NACK signals to the transmitting device, wherein the ACK/NACK signals include information indicating whether each ACK group has received sub-packets.

The extension control field 100 includes link recommendation request information and link recommendation information according to the embodiment of the present invention. The extension control field 100 includes a fast link mode field 1000 indicating the presence of a fast link mode, an HRP mode field 1001, an LRP mode field 1002, a transmit power control (TPC) field 1003 including information for requesting a recommendation of transmission power control, and a reserved field 1004.

The fast link mode field 1000 includes information indicating whether a corresponding MAC extension header includes link recommendation request information or link recommendation information in response to the request information in the fast link recommendation scheme.

For example, in a state that 2 bits are allocated to the fast link mode field 1000, if the bit value is '00', it indicates that link recommendation is not requested. If the bit value is '01', it indicates that link recommendation is requested. If the bit value is '10', it indicates that link recommendation information is included in the fast link mode field. If the bit value is '11', it indicates that use of the field is reserved. Accordingly, in the aforementioned embodiment, if the transmitting device requests the receiving device of link recommendation, the bit value of '01' is set to the fast link mode field 1000. If the receiving device transmits the link recommendation information to the transmitting device, the bit value of '10' is set to the fast link mode field 1000. However, message types indicated by the bit values corresponding to the fast link mode field 1000 are only exemplary, and modifications can be made in the message types indicated by the bit values. Various kinds of link recommendation mode information can be transferred depending on the bits allocated to the fast link mode field.

The HRP mode field 1001 and the LRP mode field 1002 may be used as an HRP request field and an LRP request field depending on the bit values set in the fast link mode field 1000, or may include response information to the request. Namely, if the fast link mode field 1000 includes link recommendation information, the HRP mode field 1001 and the LRP mode field 1002 includes information of HRP mode and LRP mode to be recommended by the receiving device.

The HRP mode field 1001 includes information indicating whether to change the HRP mode currently in service and index information of the HRP mode to be recommended if the current HRP mode is changed. For example, as 4 bits are allocated to the HRP mode field, if the bit value of the HRP mode field is set to '1111', it is recommended that the current HRP mode is maintained. At this time, if the transmitting device is using a spatial multiplexing (SM)-HRP mode, the receiving device can select the HRP mode based on data streams having the highest signal strength.

Likewise, the LRP mode field 1002 includes information indicating whether to change the LRP mode currently in service and index information of the LRP mode to be recommended. For example, as 3 bits are allocated to the LRP mode field 1002, if the bit value of the LRP mode field is set to '111', it is recommended that the current LRP mode is maintained.

In this case, the HRP mode includes one or more modes depending on a code mode applied to data included in each of sub-packets constituting a packet body, a modulation scheme, a coding rate, etc. The coding mode can be divided into a coding mode of the aforementioned unequal data protection, a coding mode of an equal error protection (EEP), and a most significant bit (MSB) retransmission scheme. The modulation scheme includes quadrature phase-shift keying (QPSK) scheme and 16-quadrature amplitude modulation (QAM) scheme. The QPSK scheme is a modulation scheme that 2 bits are transmitted to correspond to four phases of carriers. The 16-QAM scheme is a modulation scheme that amplitude and phase of carriers are combined with each other to represent one signal using 4 bits of 16 levels.

Examples of the LRP include omni-directional LRP, directional LRP, and beamforming LRP. The LRP mode includes one or more modes depending on a modulation scheme, a forward error correction (FEC) mode, a PHY data rate mode, and a repetition period. In the LRP, a binary phase-shift keying (BPSK) scheme is used as the modulation scheme. The FEC mode is used such that a recipient predicts a message using repeated bits. The FEC mode includes one or more modes depending on the repeated bits.

The TPC field 1003 includes TPC information. Likewise, the TPC field 1003 is identified as a field for requesting TPC information or a field for transmitting TPC information depending on the bit value set in the fast link mode field 1000. If the fast link mode field 1000 includes indication information indicating that the fast link mode field 1000 includes link recommendation information, the TPC field 1003 can include TPC information.

For example, as 2 bits are allocated to the TPC field 1003, if the bit value is set to '00', it is recommended that the current transmission power should be maintained. If the bit value is set to '01', it is recommended that the transmission power should increase by 2 dB. If the bit value is set to '10', it is recommended that the transmission power should decrease by 2 dB. If the bit value is set to '11', it indicates that use of the TPC field is reserved. However, information indicated by the bit values set in the TPC field 1003 is only example of TPC recommendation information, and can be varied. Also, if bits allocated to the TPC field 1003 increase, more various power offsets than 2 dB indicated in the aforementioned can be recommended, and the information indicated by the bit values set in the TPC field 1003 can also include information of transmission power change cause.

Meanwhile, the transmitting device according to the embodiment of the present invention may request the receiving device of detailed TPC information before deciding whether to change the transmission power based on the TPC information received during link recommendation.

Figure 18:
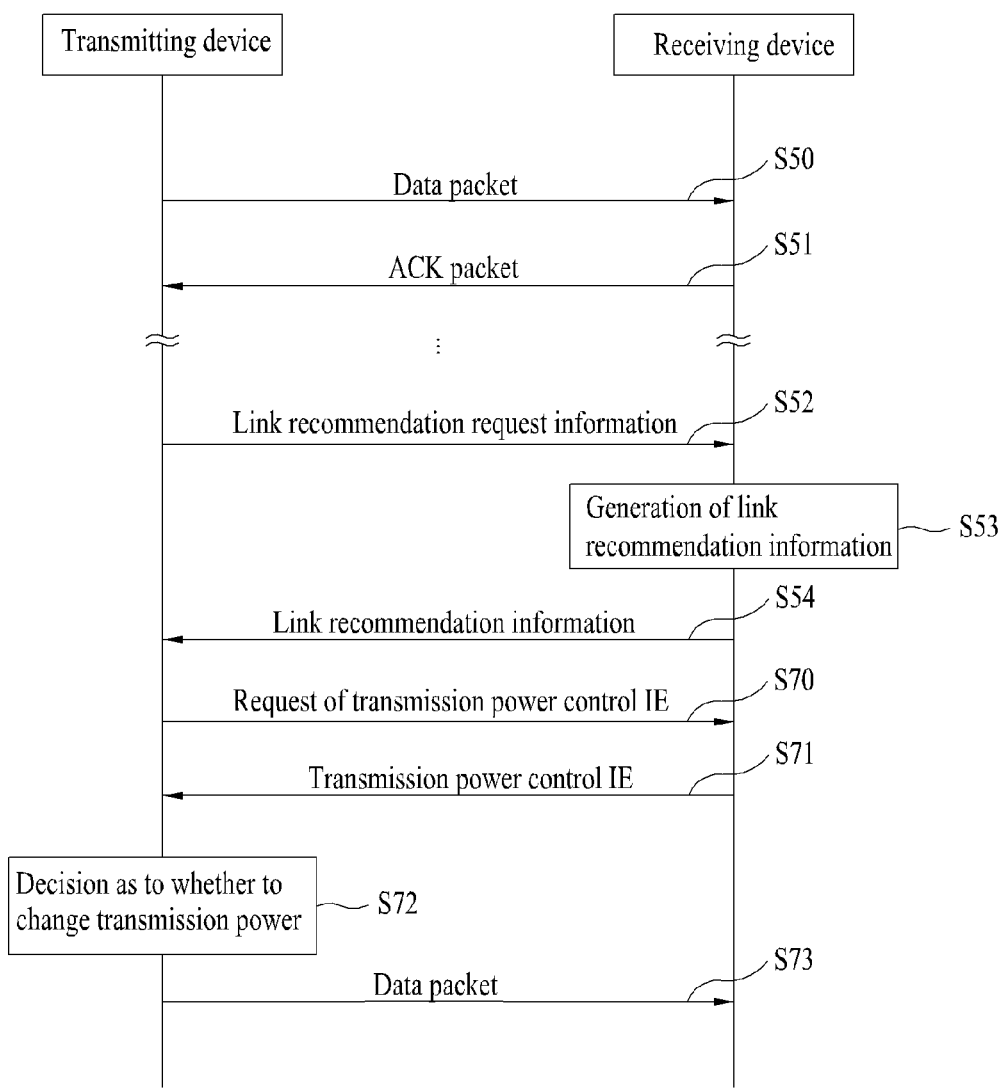
FIG. 18 is a diagram illustrating other example of a link recommendation procedure for transmission power control for link adaptation in a WVAN device according to one embodiment of the present invention.

FIG. 18 is a diagram illustrating other example of a link recommendation procedure for transmission power control for link adaptation in a WVAN device according to one embodiment of the present invention. Specifically, FIG. 18 illustrates an example of link recommendation in the active mode of the fast link recommendation method.

Referring to FIG. 18, the WVAN receiving device receives a data packet from the WVAN transmitting device, wherein the data packet includes a normal data packet and a composite data packet (S50). Then, the WVAN receiving device transmits ACK packet in response to the data packet and transmits link recommendation information in accordance with a request of the transmitting device, wherein the link recommendation information includes TPC information (S51 to S54). These steps S50 to S54 are the same as those illustrated in FIG. 14. For briefness of description, description of the same steps will be omitted.

The transmitting device which has received link recommendation information including TPC information from the receiving device in accordance with the embodiment of the present invention can transmit a probe request message for requesting a TPC information element (S70). The receiving device transmits a probe response message to the transmitting device in accordance with the probe request message, wherein the probe response message includes TPC information and RSSI information (S71).

In other words, according to the embodiment of the present invention illustrated in FIG. 18, the transmitting device may request the receiving device of required information before performing control of transmission power, and decide whether to control the transmission power based on the requested information (S72). The transmitting device can transmit data to the receiving device by using the transmission power changed during next data transmission or in a state that the original transmission power is maintained (S73).

Also, even in the fast link recommendation method of the passive mode, the transmitting device according to the embodiment of the present invention can request the receiving device of TPC information element before deciding whether to change the transmission power.

Figure 19:
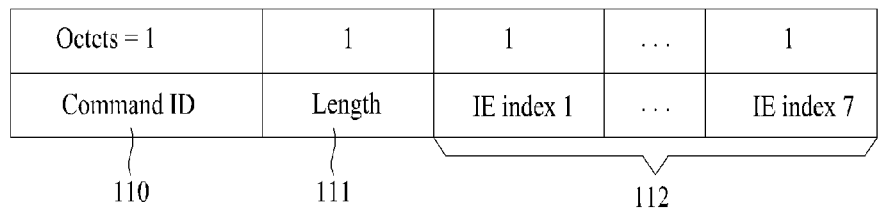
FIG. 19 is a diagram illustrating an example of a data format that includes a probe request message transmitted from a WVAN transmitting device according to one embodiment of the present invention.

FIG. 19 is a diagram illustrating an example of a data format that includes a probe request message transmitted from a WVAN transmitting device according to one embodiment of the present invention. The probe request message is transmitted from the transmitting device to the receiving device as a command requesting an information element (IE) to be requested by the transmitting device, i.e., but not limited to, a MAC command type.

Referring to FIG. 19, the probe request message transmitted from the transmitting device to the receiving device includes a command ID field 110 including identification information indicating a MAC command type, a MAC command length field 111, and an information element (IE) index field 112 including at least one IE index to be requested.

The IE index field 112 means index of IE to be requested by the device that transmits the probe request message, and can indicate an information element (IE) of a new coordinator, an information element (IE) of a power save mode, and an information element (IE) of WVAN parameter change. According to one embodiment of the present invention, the transmitting device can set index of an information element related to control of transmission power in the IE index field 112.

The probe request message can be transmitted to one or more devices or coordinators, and the device or coordinator which has received the probe request message can transmit the probe response message. However, the device or coordinator is not necessarily required to transmit the response message. The receiving device which has received the probe request message requesting a TPC IE can transmit a TPC report IE as the probe response message in accordance with the embodiment of the present invention.

Figure 20:
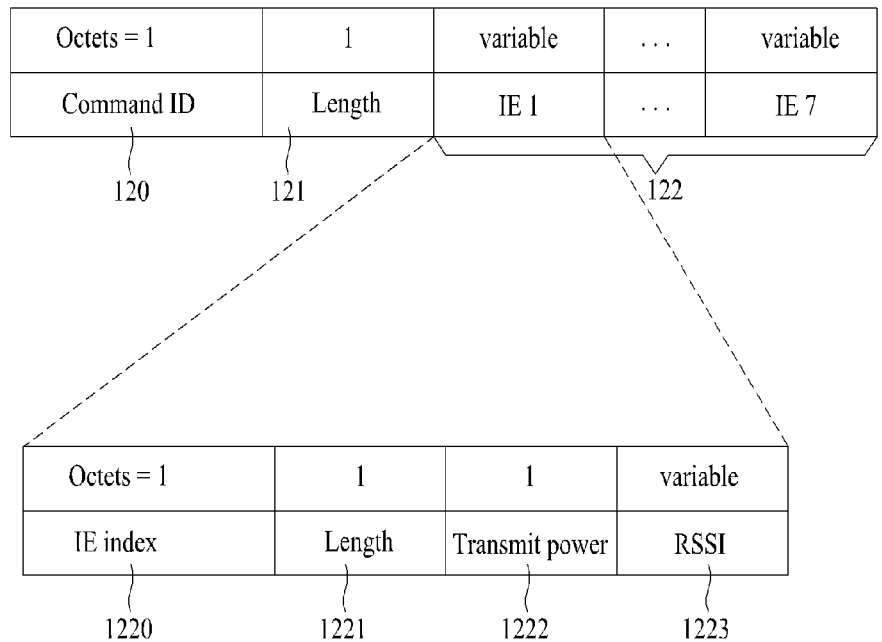
FIG. 20 is a diagram illustrating an example of a data format that includes a probe response message transmitted from a WVAN device according to one embodiment of the present invention.

FIG. 20 is a diagram illustrating an example of a data format that includes a probe response message transmitted from a WVAN device according to one embodiment of the present invention. Specifically, the data format includes a TPC report IE. The probe response message can be transmitted in, but not limited to, a MAC command type.

Referring to FIG. 20, the probe response message includes a command ID field 120 including ID indicating a command type, a length field 121 indicating a MAC command length, and an IE field 122 including at least one requested IE.

The IE field 122 is to indicate an information element (IE) included in the probe request message. If the IE field 122 includes a TPC IE in accordance with the embodiment of the present invention, as illustrated in FIG. 20, the IE field 122 includes an IE index field 1220, a length field 1221 indicating a length of an IE, a transmission power field 1222 indicating transmission power used during signal transmission, and an RSSI field 1223 indicating RSSI.

The transmission power field 1222 can indicate a power level using 2's complement notation in a unit of dB. For example, a power level of +2 dB is set to 0x02 bits, and a power level of −2 dB is set to 0xFE bits.

The RSSI field 1223 indicates strength of a currently received signal, which is measured relatively to sensitivity of the receiving device. For example, if the RSSI is measured as 6 dB through sensitivity of the receiving device in the current physical layer mode, the RSSI field 1223 can be set to 0x06 bits.

The transmitting device which has received the probe response message including the TPC IE can control the transmission power based on the TPC IE.

Figure 21:
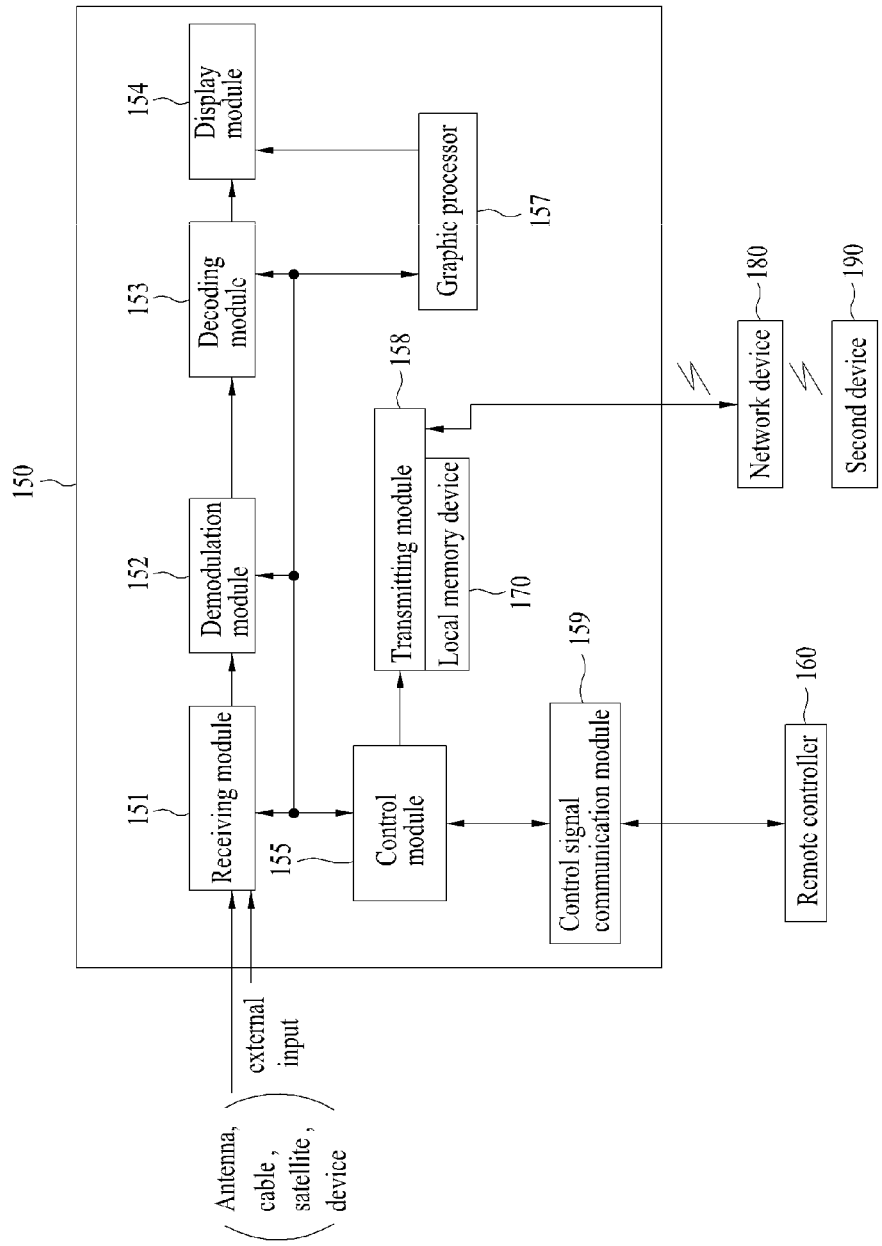
FIG. 21 is a diagram illustrating an example of a broadcasting signal processing system that includes a WVAN device according to one embodiment of the present invention.

FIG. 21 is a diagram illustrating an example of a broadcasting signal processing system that includes a WVAN device according to one embodiment of the present invention.

Generally, the WVAN device can play A/V data through processes which will be described layer, wherein the A/V data are input from at least one of a broadcasting station, cable, satellite, and other WVAN device through an antenna. If the WVAN device receives data from other device, it could be a receiving device. If the WVAN device transmits data to other device, it could be a transmitting device. Also, the WVAN device can perform message exchange with the coordinator.

Referring to FIG. 21, the broadcasting signal processing system according to the embodiment of the present invention includes a receiving device 150, a remote controller 160, a local memory device 170, and a network device 180 for performing wireless communication with a transmitting device 190.

The receiving device 150 that receives A/V data includes a receiving module 151, a demodulation module 152, a decoding module 153, a display module 154, a control module 155, a graphic processor 157, a transmitting module 158, and a control signal communication module 159. In the example of FIG. 21, the transmitting device further includes a local memory device 170 directly connected with the transmitting module 158 that includes input and output ports. However, the local memory device 170 may be a memory device mounted in the transmitting device 150.

The transmitting module 158 can communicate with a wire/wireless network device 180, and can be connected with at least another device 190 through the network device 180, wherein the at least one device 190 exists on the wireless network. The control signal communication module 159 receives a user control signal in accordance with a user control device, for example, remote controller, and outputs the received signal to the control module 155.

The receiving module 151 could be a tuner that receives a broadcasting signal of a specific frequency through at least one of ground wave, satellite, cable, and Internet network. The receiving module 151 may be provided respectively for each of broadcasting sources, for example, ground wave broadcasting, cable broadcasting, satellite broadcasting, and personal broadcasting. Alternatively, the receiving module 151 may be a unified tuner. Also, supposing that the receiving module 151 is a tuner for ground wave broadcasting, at least one digital tuner and at least one analog tuner may be provided respectively, or a digital/analog tuner may be provided.

Furthermore, the receiving module 151 may receive internet protocol (IP) streams transferred through wire and wireless communication. If the receiving module 151 receives IP streams, the receiving module 151 can process transmitting and receiving packets in accordance with an IP protocol that establishes source and destination information for received IP packets and packets transmitted from the receiver. The receiving module 151 can output video/audio/data streams included in the received IP packets in accordance with the IP protocol, and can generate transport streams to be transmitted to the network as IP packets in accordance with the IP protocol so as to output them. The receiving module 151 is an element that receives an externally input video signal, and, for example, may receive IEEE 1394 type video/audio signals or HDMI type streams from the outside.

Also, the receiving module 151 can receive link recommendation request information from the transmitting device in accordance with one embodiment of the present invention, wherein the link recommendation request information includes TPC request information.

The demodulation module 152 demodulates broadcasting signals among data input through the receiving module 151 or broadcasting signals transmitted from the receiving device in an inverse order of a modulation mode. The demodulation module 152 outputs broadcasting streams by demodulating the broadcasting signals. If the receiving module 151 receives stream type signals, for example, IP streams, the IP streams are output to the decoding module 153 after bypassing the demodulation module 152.

The decoding module 153 includes an audio decoder and a video decoder, and decodes the broadcasting streams output from the demodulation module 152 through a decoding algorithm and outputs the decoded streams to the display module 154. At this time, a demultiplexer (not shown) that splits each stream in accordance with a corresponding identifier may additionally be provided between the demodulation module 152 and the decoding module 153. The demultiplexer splits the broadcasting signals into an audio element stream (ES) and a video element stream and outputs them to each decoder of the decoding module 153. Also, if a plurality of programs are multiplexed in one channel, the demultiplexer selects only a broadcasting signal of a program selected by a user and splits the selected broadcasting signal into a video element stream and an audio element stream. If data streams or system information streams are included in the demodulated broadcasting signals, they are split by the demultiplexer and then transferred to a corresponding decoding block (not shown).

The display module 154 displays broadcasting contents received from the receiving module 151 and contents stored in the local memory device 170. The display module 154 can display a menu indicating whether the memory device has been mounted in the transmitting device and information related to the remaining capacity of the memory device, in accordance with a control command of the control module 155, and can be operated under the control of the user.

The control module 155 can control the operations of the aforementioned modules (receiving module, demodulation module, decoding module, display module, graphic processor, spatial multiplexing precoder and beamforming module, and interface module). Also, the control module 155 displays a menu that receives a control command of the user, and drives an application that displays various kinds of information or menu of the broadcasting signal processing system for the user.

For example, the control module 155 can read out the contents stored in the local memory device 170 if the local memory device 170 is mounted in the transmitting device. Also, the control module 155 can control the operation of the local memory device 170 so that the broadcasting contents received from the receiving module 151 are stored in the local memory device 170 if the local memory device 170 is mounted in the transmitting device. Furthermore, the control module 155 can output a control signal for mounting the local memory device 170 depending on whether the local memory device 170 has been mounted in the transmitting device.

The control module 155 checks remaining memory capacity of the local memory device 170, and allows information of the remaining memory capacity to be displayed for the user on the display module 154 through the graphic processor 157. The control module 155 can shift the contents stored in the local memory device 170 to the remote memory device if the remaining memory capacity of the local memory device 170 is not sufficient. In this case, the control module 155 can display a menu indicating whether to shift the contents stored in the local memory device 170 to another local memory device (not shown) or the remote memory device through the display module 154. And, the control module 155 can receive and process a user control signal of the menu. Accordingly, the control module 155 can allow the contents stored in the local memory device 170 and other directly or remotely mounted memory device to be shifted between them and stored therein.

Also, the control module 155 can assess the channel status or measure RSSI during signal reception through the receiving module 151. According to the aforementioned embodiment, the control module 155 can measure transmission power capacity for proper RSSI if the measured RSSI is changed due to change of the physical distance between the transmitting device and the receiving device. And, the control module 155 can generate link recommendation information including TPC information and control the transmitting module 158 to transmit the generated link recommendation information to the transmitting device. At this time, the generated link recommendation information is transmitted to the transmitting device by being encapsulated in the ACK/NACK signal to the data transmitted from the transmitting device.

The graphic processor 157 processes a graphic to be displayed so that a menu screen is displayed in a video image displayed by the display module 154, and controls the graphic to be displayed in the display module 154 together with the menu screen.

The transmitting module 158 can be used to transmit the data packet generated by the control module 155 to other device 190 through the wire and wireless network, or transmit data from the transmitting device 150 to another device.

Also, the transmitting module 158 can include an interface module to perform bidirectional communication between the devices belonging to the WVAN. The interface module can be interfaced with at least one other device 190 through the wire and wireless network. Examples of the interface module include Ethernet module, Bluetooth module, short distance wireless Internet module, portable Internet module, home PNA module, IEEE1394 module, PLC module, home RF module, and IrDA module.

If the broadcasting signal processing system illustrated in FIG. 21 includes the transmitting device according to one embodiment of the present invention, elements or modules constituting the device and the system include the same as those illustrated in FIG. 21. However, the transmitting device can receive link recommendation information including TPC information from the receiving device through the receiving module 151, and the control module 155 can perform link adaptation in accordance with the link recommendation information. Also, the control module 155 can generate link recommendation request information requesting the receiving device of link recommendation information and control the transmitting module 159 to transmit the generated link recommendation request information to the receiving device. At this time, the generated link recommendation request information is transmitted to the receiving device by being encapsulated in the data packet transmitted to the receiving device. Also, the control module 155 may decide whether to control the transmission power in accordance with the TPC information included in the link recommendation information.

The terms herein can be replaced with other terms. For example, "device" can be replaced with user device (or machine), station, etc., and "coordinator" can be replaced with coordinating (control) device, coordinating (or control) station, piconet coordinator (PNC), etc. Also, the WVAN parameter configuring the WVAN can be used to refer to network configuration information.

It will be apparent that some claims referring to specific claims may be combined with another claims referring to the other claims other than the specific claims to constitute the embodiment or add new claims by means of amendment after the application is filed.

Also, the data packet means information which is transmitted and received, such as message, traffic, video/audio data packet, control data packet, but not limited to a specific data packet. Also, the message can be used to refer to command.

Finally, examples of devices that can perform communication in a communication system include computers, PDAs, notebook computers, digital TVs, camcorders, digital cameras, printers, mikes, speakers, headsets, bar-code readers, displays, and cellular phones. All digital devices can be used as the devices.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A method of exchanging messages at a receiving device in a wireless network, the method comprising:
    receiving a link recommendation request message from a transmitting device, wherein the link recommendation request message is included in a first Medium Access Control (MAC) extension header of a first data packet which includes user data to be transmitted to the receiving device from the transmitting device; and
    transmitting an ACK packet to the transmitting device in response to the first data packet, the ACK packet comprising a second MAC extension header which includes transmit power control (TPC) information, wherein the TPC information is to be used by the transmitting device to determine whether to change transmission power of the transmitting device, and wherein the TPC information is determined based on a channel status of a channel on which the first data packet is received,
    wherein the second MAC extension header comprises:
    an extension control field comprising control information;
    a type field indicating a type of data included in sub-packets constituting the ACK packet;
    a low-rate physical (LRP) antenna direction tracking (ADT) feedback field comprising ADT feedback information for obtaining an optimized transmission pattern during future signal transmission in an LRP unidirectional mode;
    an ACK group field comprising information indicating whether preceding sub-packets exist; and
    at least one clock field comprising clock count information of video data or audio data.

2. The method of claim 1, wherein the extension control field further comprises a link mode field indicating a type of link recommendation, a high-rate physical (HRP) mode field indicating a recommended HRP mode to be used at the transmitting device, an LRP mode field indicating a recommended LRP mode to be used at the transmitting device and a TPC field comprising the TPC information.

3. The method of claim 2, wherein the link mode field indicates "link recommendation is not being requested", "link recommendation request" or "link recommendation response".

4. The method of claim 1, wherein the TPC information comprises a value indicating a recommendation for controlling the transmission power of the transmitting device.

5. The method of claim 4, wherein the value indicates that no change of the transmission power is recommended.

6. The method of claim 4, wherein the value indicates that increase of the transmission power is recommended by a predetermined amount.

7. The method of claim 4, wherein the value indicates that decrease of the transmission power is recommended by a predetermined amount.

8. A receiving device of a wireless network, the receiving device comprising:
    a transmitting module;
    a receiving module receiving a link recommendation request message from a transmitting device, wherein the link recommendation request message is included in a first Medium Access Control (MAC) extension header of a first data packet which includes user data to be transmitted to the receiving device from the transmitting device; and
    a control module generating link recommendation information and controlling the transmitting module to transmit an ACK packet to the transmitting device in response to the first data packet, the ACK packet comprising a second MAC extension header which includes transmit power control (TPC) information, wherein the TPC information is to be used by the transmitting device to determine whether to change transmission power of the transmitting device, and wherein the TPC information is determined based on a channel status of a channel on which the first data packet is received,
    wherein the second MAC extension header comprises:
    an extension control field comprising control information;
    a type field indicating a type of data included in sub-packets constituting the ACK packet;
    a low-rate physical (LRP) antenna direction tracking (ADT) feedback field comprising ADT feedback information for obtaining an optimized transmission pattern during future signal transmission in an LRP unidirectional mode;
    an ACK group field comprising information indicating whether preceding sub-packets exist; and
    at least one clock field comprising clock count information of video data or audio data.

9. The receiving device of claim 8, wherein the extension control field comprises a link mode field indicating a type of link recommendation, a high-rate physical (HRP) mode field indicating a recommended HRP mode to be used at the transmitting device, an LRP mode field indicating a recommended LRP mode to be used at the transmitting device and a TPC field comprising the TPC information.

10. The receiving device of claim 9, wherein the link mode field indicates "link recommendation is not being requested," "link recommendation request," or "link recommendation response".

11. The receiving device of claim 8, wherein the TPC information comprises a value indicating a recommendation for controlling the transmission power of the transmitting device.

12. The receiving device of claim 11, wherein the value indicates that no change of the transmission power is recommended.

13. The receiving device of claim 11, wherein the value indicates that increase of the transmission power is recommended by a predetermined amount.

14. The receiving device of claim 11, wherein the value indicates that decrease of the transmission power is recommended by a predetermined amount.

* * * * *